(12) United States Patent
Schaepe et al.

(10) Patent No.: US 8,319,793 B2
(45) Date of Patent: *Nov. 27, 2012

(54) ANALYZING PIXEL DATA BY IMPRINTING OBJECTS OF A COMPUTER-IMPLEMENTED NETWORK STRUCTURE INTO OTHER OBJECTS

(75) Inventors: Arno Schaepe, Starnberg (DE); Guenter Schmidt, Munich (DE); Owen Feehan, Munich (DE); Gerd Binnig, Kottgeisering (DE)

(73) Assignee: Definiens AG, Munich (DE)

( * ) Notice: Subject to any disclaimer, the term of this patent is extended or adjusted under 35 U.S.C. 154(b) by 894 days.

This patent is subject to a terminal disclaimer.

(21) Appl. No.: 12/386,380

(22) Filed: Apr. 17, 2009

(65) Prior Publication Data

US 2010/0265267 A1 Oct. 21, 2010

(51) Int. Cl.
*G09G 5/14* (2006.01)

(52) U.S. Cl. ....................................................... 345/619

(58) Field of Classification Search ................... 345/619
See application file for complete search history.

(56) References Cited

U.S. PATENT DOCUMENTS

| 7,801,361 B2 * | 9/2010 | Binnig et al. | ................. | 382/227 |
| 2008/0008349 A1 * | 1/2008 | Binnig et al. | ................. | 382/100 |

* cited by examiner

*Primary Examiner* — Javid A Amini

(74) *Attorney, Agent, or Firm* — Imperium Patent Works; Darien K. Wallace

(57) ABSTRACT

An analysis system analyzes digital images using a computer-implemented network structure that includes a process hierarchy, a class network and a data network. The data network includes image layers and object networks. Objects in a first object network are segmented into a first class, and objects in a second object network are segmented into a second class. One process step of the process hierarchy involves generating a third object network by imprinting objects of the first object network into the objects of the second object network such that pixel locations are unlinked from objects of the second object network to the extent that the pixel locations were also linked to objects of the first object network. The imprinting step allows object-oriented processing of digital images to be performed with fewer computations and less memory. Characteristics of an object of the third object network are then determined by measuring the object.

40 Claims, 25 Drawing Sheets

SPECIFICATION MODE

EXECUTION MODE

ANALYZING PIXEL DATA BY IMPRINTING OBJECTS OF A COMPUTER-IMPLEMENTED NETWORK STRUCTURE INTO OTHER OBJECTS

TECHNICAL FIELD

The present invention relates generally to analyzing target patterns in digital images, and more specifically to a computer-implemented system for detecting and measuring those target patterns.

BACKGROUND

Various systems have been developed for detecting and analyzing target patterns in digital images. A digital image is a rectangular array of pixels. Each pixel is characterized by its position in the array and a plurality of numerical pixel values associated with the pixel. The pixel values represent color or grayscale information for various image layers. For example, grayscale digital images are represented by a single image layer, whereas RGB true-color images are represented by three image layers. Some existing analysis systems apply semantic networks to analyze the contents of the digital images. Systems that apply semantic networks perform object-oriented picture analysis, as opposed to solely statistical pixel-oriented analysis. Consequently, semantic network systems classify not only pixels, but also data objects linked to the pixels. The data objects that are linked to the pixels and to one another represent measurable information about the digital images.

Although object-oriented analysis can provide better results than pixel-oriented analysis alone, object-oriented analysis is also more computationally involved. Therefore, object-oriented analysis is often slower than statistical pixel-oriented analysis alone.

A method is sought that retains the advantages of object-oriented analysis, yet enhances the performance of analysis systems based on computer-implemented semantic networks. Such a method would efficiently manage the computational resources of the object-oriented analysis systems.

SUMMARY

An analysis system analyzes patterns present in digital images using a computer-implemented network structure that includes a process hierarchy, a class network and a data network. The data network includes image layers of pixel values and object layers of a hierarchical object network. In an iterative analysis process, the pixel values, objects, object classes and process steps of the process hierarchy are linked and re-linked to each other to generate the network structure.

Objects in a first object network are categorized as belonging to a first class, and objects in a second object network are categorized as belonging to a second class. One process step of the process hierarchy involves generating a third object network by imprinting objects of the first object network into the objects of the second object network such that pixel locations are re-linked from objects of the second object network to objects of the third object network to the extent that objects remaining unaffected by the imprinting procedure will keep all their already existing links to their pixel locations. Relevant for the circumstance whether an object is affected by imprinting or not is the overlap of imprinted object with the object to be imprinted. In the general case the overlap will be calculated only after the imprinted objects have been transformed. Typical transformations will be applied in form of scaling, rotation, and translation from a location within a first image to an equivalent location in a second image, or a combination of several different transformations of that kind. The overlap of post-transform imprint-objects ("pti-objects") and objects to be imprinted ("tbi-objects") defines the new objects of the third object network. Each new imprinted object belonging to the third object network will be created from an individual pti-object exhibiting a finite overlap to tbi-objects by linking the new object to all pixel locations, where this particular pti-objects overlaps with tbi-objects. If as a result of the imprinting only connected objects are desired by a user, as many objects are created from each pti-object as connect overlap-regions to tbi-objects. In this case all pixel locations of one overlap region are linked to one of those objects.

A method includes generating objects by linking pixel locations of an acquired digital image to objects in the lowest level of the hierarchical object network. Pixel locations with similar pixel values might be linked to the same object. An object is concretely defined by the plurality of pixel locations linked to this object. A first plurality of objects that forms a first object network is generated by linking a first plurality of pixel locations to the first plurality of objects. The first plurality of objects is also linked to a first object class. A second plurality of objects that forms a second object network is generated by linking a second plurality of pixel locations to the second plurality of objects. The second plurality of objects is linked to a second object class. A third plurality of the pixel locations includes those pixel locations that belong both to the first plurality and to the second plurality of the pixel locations.

A third object network is then generated by imprinting the first plurality of objects into the second plurality of objects such that each of the third plurality of pixel locations is unlinked from an effected object of the second plurality of objects and will be re-linked to an object of a third plurality of objects, defined by the overlap between post-transform objects of the first plurality of objects and the objects of the second plurality of objects. Characteristics of objects in the third object network are then determined by measuring the objects. In one implementation, the third object network is generated by imprinting the first plurality of objects belonging to a first digital image into a second plurality of objects belonging to a second digital image.

In another embodiment, objects in a first object network are categorized as belonging to a first class, and objects in a second object network are categorized as belonging to a second class. One process step of the process hierarchy involves generating a third object network by imprinting objects of the first object network into the objects of the second object network such that pixel locations are unlinked from objects of the second object network to the extent that the pixel locations were also linked to objects of the first object network. The imprinting step allows object-oriented processing of digital images to be performed with fewer computations and less memory. A characteristic of an object of the third object network is determined by measuring the object.

Another method includes generating objects by linking pixel locations of an acquired digital image to objects in the lowest level of the hierarchical object network. Pixel locations with similar pixel values are linked to the same object. A first plurality of objects that forms a first object network is generated by linking a first plurality of pixel locations to the first plurality of objects. The first plurality of objects is also linked to a first object class. A second plurality of objects that forms a second object network is generated by linking a second plurality of pixel locations to the second plurality of objects. The second plurality of objects is linked to a second object class. A third plurality of the pixel locations includes those pixel locations that belong both to the first plurality and to the second plurality of the pixel locations.

A third object network is then generated by imprinting the first plurality of objects into the second plurality of objects such that each of the third plurality of pixel locations is unlinked from an object of the second plurality of objects and remains linked to an object of the first plurality of objects. Characteristics of objects in the third object network are then determined by measuring the objects.

In one embodiment, the third object network is generated by imprinting only a first subset of the first plurality of objects into only a second subset of the second plurality of objects. The first subset includes only those objects of the first plurality of objects that fulfill a first condition, and the second subset includes only those objects of the second plurality of objects that fulfill a second condition. In one example, the first condition is having a volume greater than a threshold, and the second condition is having a length greater than a threshold.

In yet another embodiment, the third object network is generated by imprinting a scaled, rotated and translated copy of a first subset of the first image objects into a second subset of the second plurality of objects. In one example, the first subset represents detected houses in a satellite image, and the rotation is performed using the angle of the longest wall of each house.

A computer-readable medium is disclosed that has computer-executable instructions for analyzing a digital image by performing an imprinting step. In one embodiment, the computer-executable instructions are executed on two processors such that the steps of classifying a first plurality of objects into a first class is performed at the same time that a second plurality of objects is classified into a second class. In one implementation, the computer-executable instructions are in the form of an image analysis script.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Figure 1:
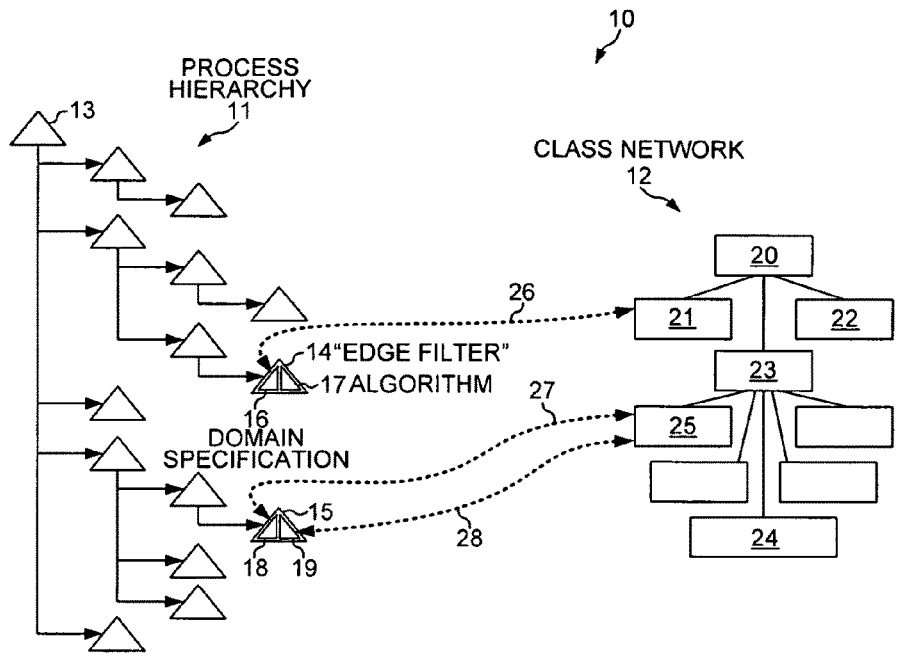
FIG. 1 is a simplified schematic diagram of a computer-implemented network structure that includes a class network and a process hierarchy.

Reference will now be made in detail to some embodiments of the invention, examples of which are illustrated in the accompanying drawings.

An analysis system analyzes and measures patterns present in the pixel values of digital images using a computer-implemented network structure. The network structure includes a process hierarchy, a class network and a data network. The data network represents information associated with each pixel location in the form of image layers and object networks. The analysis system performs both pixel-oriented processing and object-oriented processing by using that combination of data representations that yields the fastest result. Pixel-oriented and object-oriented processing is combined so that fewer computations and less memory are used to analyze an acquired digital image. An object is formed based on whether a condition would be satisfied if a particular pixel location were to be linked to the object. For example, whether a pixel location is linked to an object can depend on the shape or size of the object that would result if the pixel location were included in the object. Whether a pixel location is linked to an object can also depend on the average brightness of all of the pixel values associated with the object that would result if the particular pixel location were to be included in the object.

The data network includes image layers of pixel values associated with pixel locations that are linked to objects of object networks. Each object network has various layers of objects (also called object "levels"). The objects of the data network are classified into classes of the class network.

A method of analyzing objects using the analysis system has several advantages. The method allows alternative classifications of object obtained using differing approaches and strategies to be combined into a single analysis result. To improve run-time performance of the analysis, the alternative classifications (segmentation of objects into classes) may be concurrently computed using several cores of a multi-core computer. To reduce the memory footprint and run-time of the analysis, the alternative classifications may process only scaled-down or cropped copies of selected image channels. Furthermore, it is possible to copy only selected image objects to the results of the alternative classification. Because processing one alternative classification is independent of the processing of the other, efficient processing strategies may be used without overwriting the results of the other classification.

In a specification mode and before the pixel values are acquired, the user of the analysis system specifies the class network and the process hierarchy. The classes of the class network describe categories of objects that the user expects to find in the digital image. The process hierarchy describes how the digital image is to be analyzed in order to find a target object. The process hierarchy defines the process steps performed on the pixel values and objects. In the specification mode, the user also specifies types of links that are to connect process steps, classes and objects of the data network to each other. A link between two nodes describes the relationship between the two nodes.

In an execution mode, the analysis system performs the process steps on the acquired pixel values. By performing the process steps, pixel locations associated with particular pixel values are linked to objects, and the objects are categorized as belonging to specific classes of the class network. The analysis system links the process steps, classes and objects to each other in a manner that enables the analysis system to detect a target object that is defined by a class. For example, the analysis system can recognize where a predefined pattern occurs in the digital image.

FIG. 1 illustrates a computer-implemented network structure 10 of the analysis system in the specification mode after the user has specified a process hierarchy 11 and a class network 12. The user specifies not only the individual process steps of process hierarchy 11, but also the order in which the process steps are to be executed in the execution mode. Thus, process hierarchy 11 has a root process step 13 linked to other process steps. The process steps in turn may be linked to substeps, such as substeps 14 and 15. Each process step includes a domain specification and an algorithm. The domain specifies the classes whose associated objects will be operated upon by the algorithm in the execution mode at run time. For example, process step 14 includes a domain specification 16 and an algorithm 17. And process step 15 includes a domain specification 18 and an algorithm 19. Algorithm 17 operates on the objects specified in domain 16. The user can choose preformulated algorithms from a database of algorithms accessed by the analysis system. For example, some algorithms are used for the segmentation of objects into classes. Other algorithms are used for computation, such as for statistical calculations or to calculate the area of pixel locations linked to an object.

In this example, the user has specified various classes and subclasses of class network 12 in the specification mode. The user starts by giving each class and subclass a name. Class network 12 includes a geographic feature class 20, a land class 21, a water class 22 and a line class 23. Line class 23 has subclasses including a road class 24 and a pier class 25. Each class has an associated membership function that defines the probability that an object of the data network will belong to the particular class. The membership functions do not define whether an individual pixel location belongs to a class. Rather, each object is a group of pixel locations linked to the object, and the user specifies the membership function by defining the properties that the object must have to belong to the class. Examples of such properties include the area, shape, color and texture of the object. The area of an object may be determined, for example, by the number of pixel locations linked to the object.

FIG. 1 shows that a link 26 associates domain specification 16 with class 21 (land). A link 27 associates domain specification 18 with subclass 25 (pier). The user has also specified a link 28 between algorithm 19 and subclass 25 (pier). For example, algorithm 18 determines the length of each pier that extends into the water in part using objects linked to class 21 (land).

In the execution mode, the analysis system acquires pixel values of digital images. The analysis system can analyze a wide variety of digital images. For example, the system can be used to detect roads, buildings, islands, geographical features, military targets or weather patterns from satellite and aerial images. Radar or sonar shadows of airplanes, ships, submarines and schools of fish can also be detected and analyzed. In addition, much effort has been expended to develop systems for detecting and analyzing anatomical regions in radiological images. In the medical field, digital images are analyzed from X-ray devices, computed tomography devices (CT), ultrasound imaging devices, and magnetic resonance imaging (MRI) devices. For example, the system can analyze computed tomography (CT) images and assist in the computer-aided detection (CAD) of cancerous regions in human lungs.

Another application for the analysis system is digital pathology where large amounts of tissue image data are generated by slide scanners. For example, up to four gigapixels of data is generated per slide. The system analyzes the tissue and automatically detects and measures tissue types (normal vs. abnormal, cells und cell types (normal vs. cancerous), nuclei and nuclei types (stained positive vs. negative), membranes, and other cell components.

A pixel value is generated by the imaging device at each pixel location. The digital pixel values indicate the grey levels (brightness) in the space domain of the digital image. At run time in the execution mode, the analysis system executes the process steps as specified in process hierarchy 11 and generates a data network.

Figure 2:
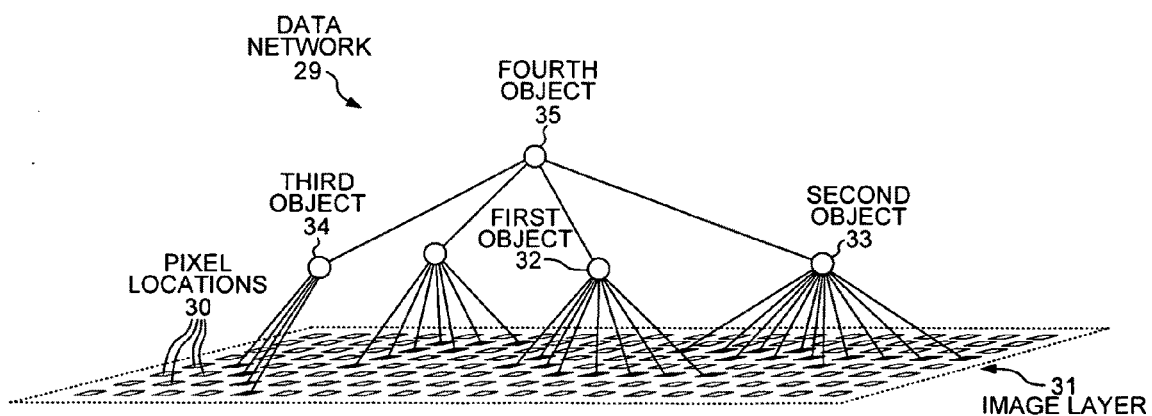
FIG. 2 is a simplified schematic diagram of a data network of the computer-implemented network structure of FIG. 1.

FIG. 2 shows a data network 29 generated in the execution mode by selectively linking pixel locations 30 from the digital image to objects according to process hierarchy 11 and class network 12. Pixel values associated with the pixel locations 30 form an image layer 31. In this example, the analysis system operates on the digital pixel values from a satellite image of an island. Data network 29 includes a first object 32, a second object 33, a third object 34 and a fourth object 35. First object 32 and second object 33 are generated by linking to the object those pixel locations associated with pixel values having similar characteristics, such as shape and brightness. Thresholds of brightness at pixel locations that are grouped together can be obtained from a histogram of the pixel values in the digital image. The objects are then linked together into classes according to the membership functions of the classes. While the classes of class network 12 describe what the user expects to find in the digital image, the objects represent concrete instances of those classes that are actually detected by the analysis system. Each object is linked to a set of pixel locations whose associated pixel values are determined by the visual appearance of the object as measured by the image acquisition device.

Figure 3:
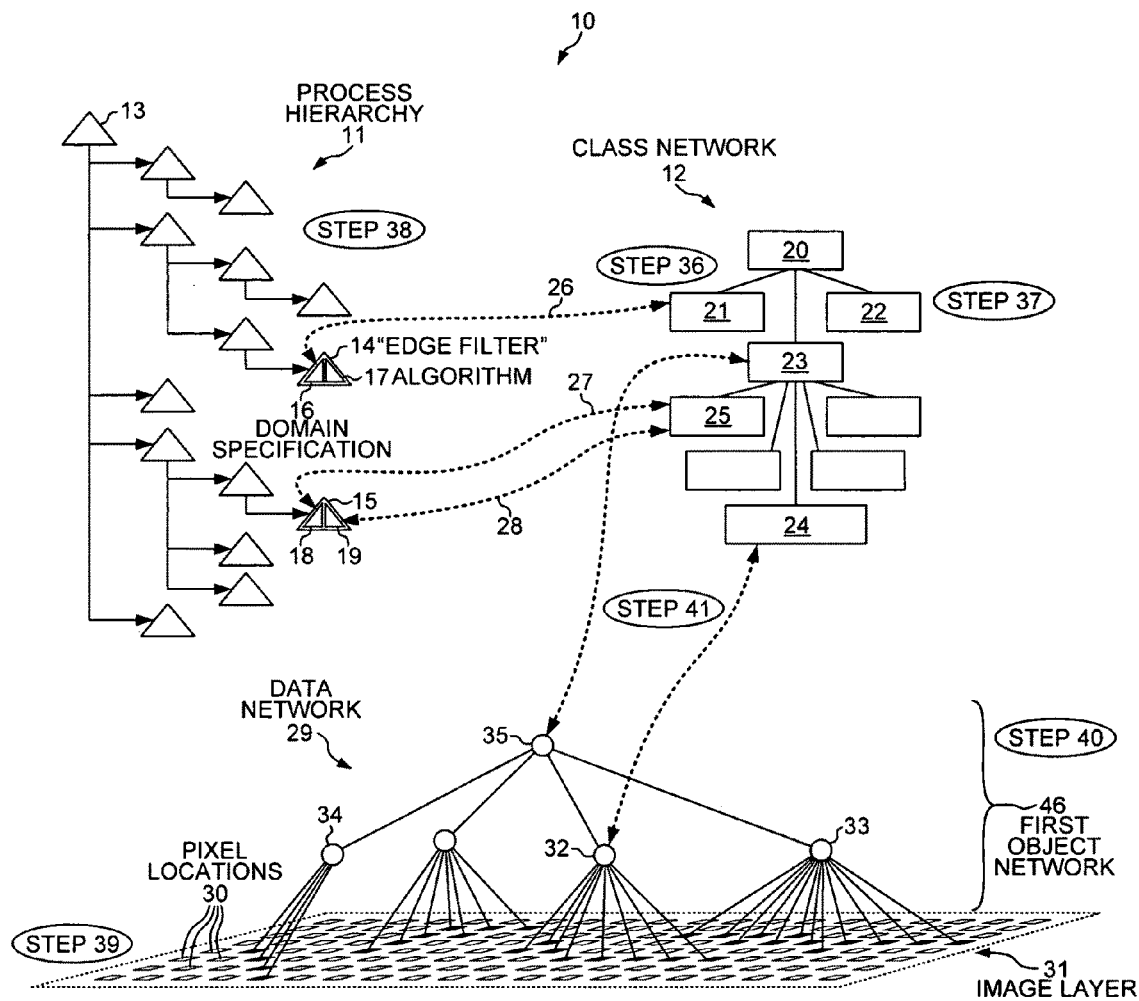
FIG. 3 is a simplified schematic diagram of the computer-implemented network structure of FIGS. 1 and 2 showing links between the data network, the class network and the process hierarchy.

FIG. 3 shows how process hierarchy 11, class network 12 and data network 29 are interlinked at run time to generate computer-implemented network structure 10. At run time, classes and process steps are linked to objects. In this example, network structure 10 is used to make a map of the roads on an island from a satellite photograph of the island.

Object-oriented image analysis can better recognize patterns in complex digital images than can pure pixel-oriented statistical processing. But object-oriented processing is computationally more intensive and therefore slower than pure statistical processing. One way to reduce the amount of computations required while retaining the higher accuracy pattern recognition of object-oriented image analysis is to combine object-oriented and pixel-oriented processing. For example, an object in a digital image can be analyzed by performing statistical processing only on pixel values associated with pixel locations that are linked to specific objects of an object network.

Another way to reduce the amount of computations required for object-oriented image analysis is to retain the results of a first set of computations performed on an image layer and combine those results with a second set of computations performed on the same image layer. In this method, the results of the first object-oriented image analysis are "imprinted" into the results of a second object-oriented image analysis.

Figure 4:
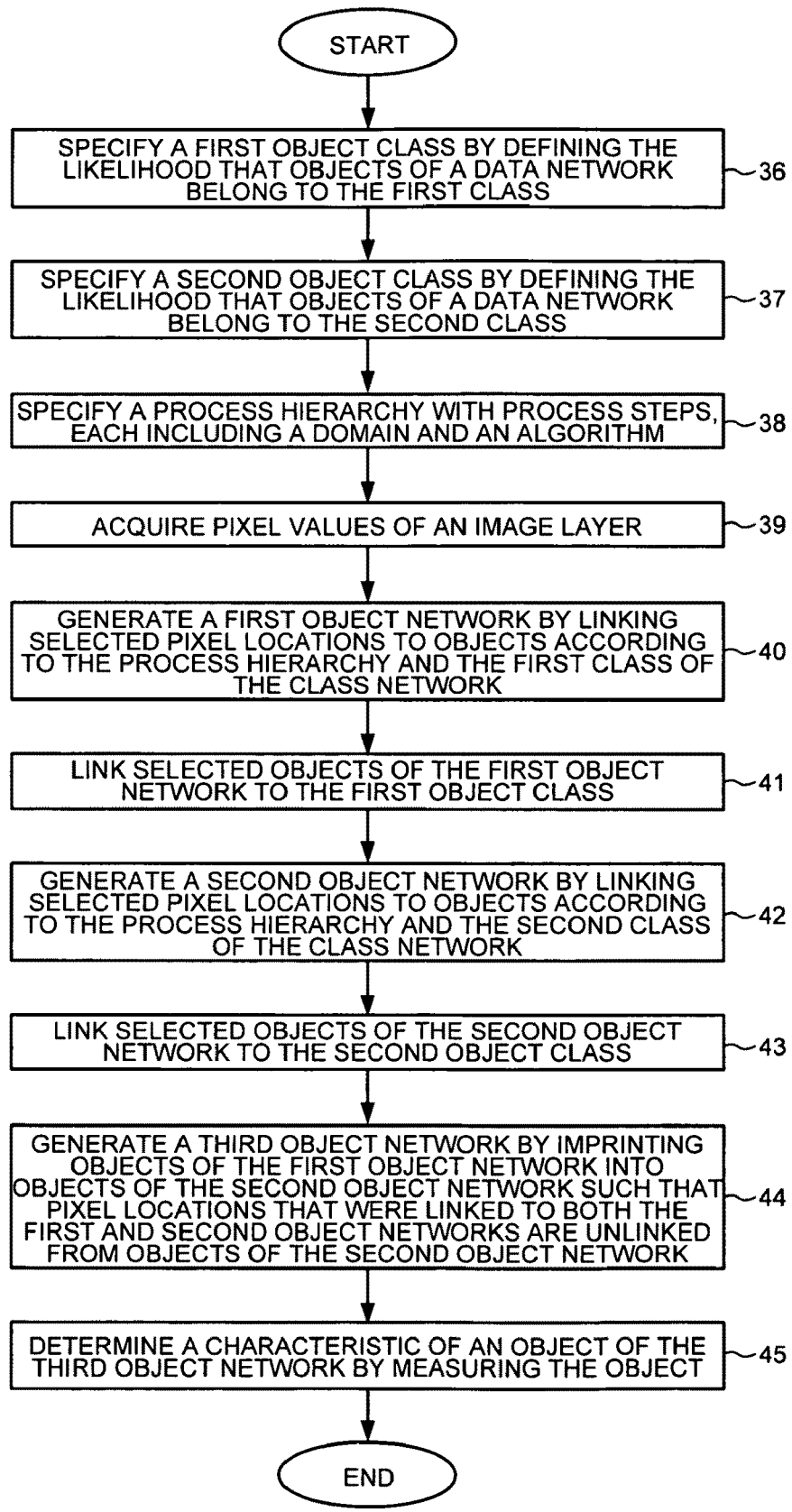
FIG. 4 is a flowchart of steps for performing computer-aided detection of target regions in digital images using the computer-implemented network structure of FIG. 3. The detection is performed by imprinting a first set of objects into a second set of objects.
Figure 5:
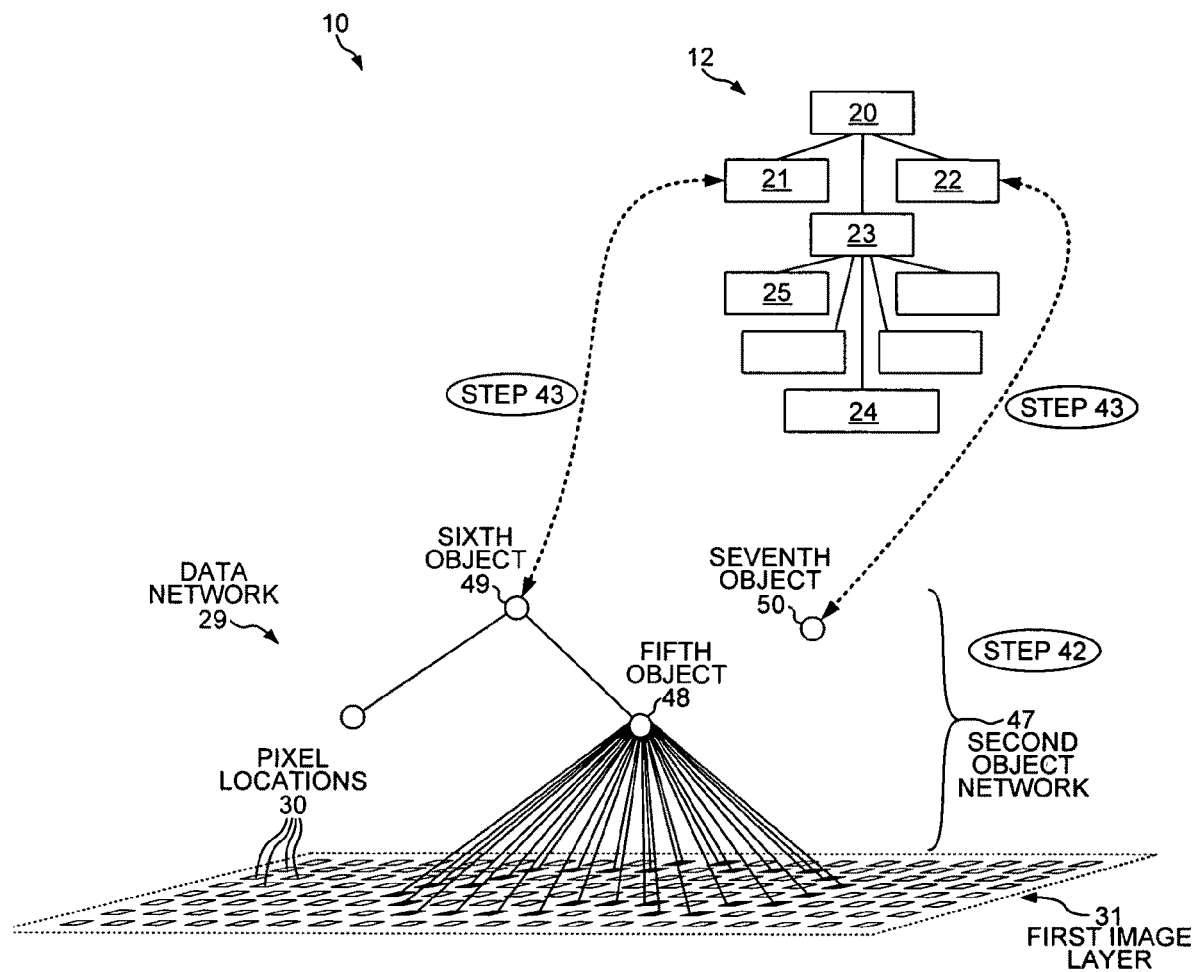
FIG. 5 is a simplified schematic diagram of an image layer and object network linked to classes of a class hierarchy.
Figure 6:
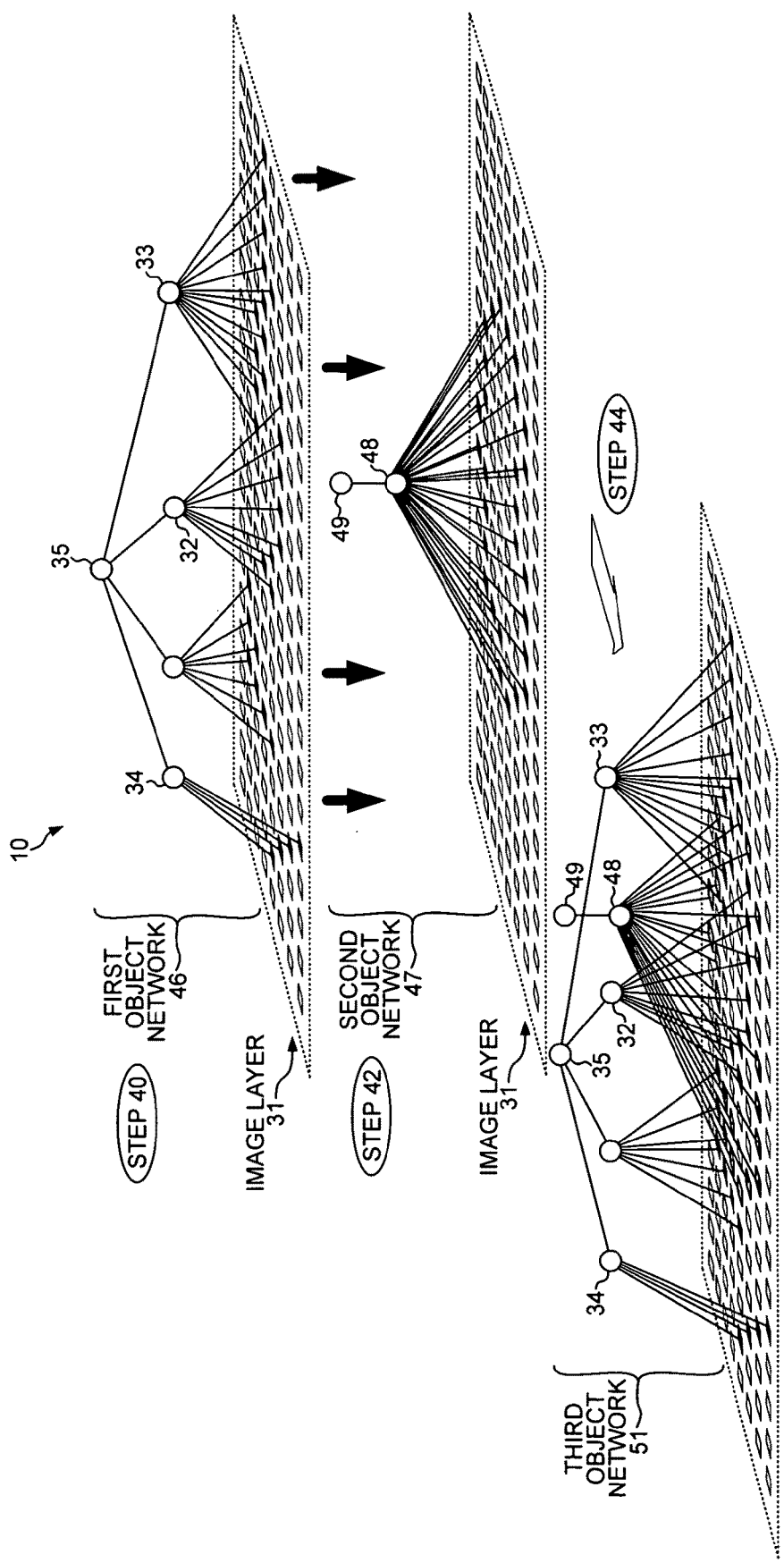
FIG. 6 is a simplified schematic diagram illustrating how objects of one object network are imprinted into objects of another object network.

FIG. 4 is a flowchart illustrating steps 36-45 of a method by which the analysis system recognizes patterns in a digital satellite image and generates a map. The method of FIG. 4 analyzes a digital image by generating two data networks of data objects that are linked in different ways to pixel locations of the same digital image. Then the data objects of a first data network are "imprinted" into the data objects of a second data network. The links from pixel locations to data objects of the second data network are deleted to the extent that those pixel locations were also linked to data objects of the first data network. The steps of FIG. 4 will now be described in relation to the operation of network structure 10 as shown in FIGS. 3 and 5-6.

In a first step 36, a user of the analysis system specifies class network 12 by defining the likelihood that objects of data network 29 will belong to each particular class of class network 12, including first object class 21 (land). The likelihood that an object belongs to a particular class is expressed as a class membership probability. In this embodiment, the user of the analysis system is a map maker who has expert knowledge of how to interpret topographical features from aerial photographs. The user defines which objects will be classified as land by virtue of the characteristics of the pixels that are linked to those objects. In another embodiment, the user of the analysis system may be a cancer research doctor who is applying his expert knowledge to train the analysis system in the specification mode. In the other embodiment, for example, the user would define the characteristics of pixels that will be classified as cancer cells.

In a step 37, a user specifies second object class 22 (water). The user defines the likelihood that objects of data network 29 will belong to the water class 22 based on the characteristics of pixels linked to those objects.

In a step 38, the user specifies process hierarchy 11. The user specifies not only the individual process steps, but also the order in which the process steps are to be executed in the execution mode. In this example, the user has specified process steps including sub-process step 14 named "Filter Edge". Sub-process step 14 includes algorithm 17 that operates on domain 16.

In a step 39, the analysis system acquires the pixel values of image layer 31. The pixel values are loaded into a memory of the analysis system.

In a step 40, the analysis system runs in the execution mode and generates data network 29 by selectively linking pixel locations 30 to objects according to the class network and the process hierarchy. Data network 29 is generated when the analysis system executes the process steps as specified in process hierarchy 13. Each object is generated by linking the object to pixel locations associated with pixel values having similar characteristics. For purposes of illustration, FIG. 3 shows that first object 32 is linked to eight pixel locations associated with pixel values having similar characteristics. In this example, the brightness of the eight pixels is similar and their orientation resembles a line. The objects linked to one another form a first object network 46.

In a step 41, each of the objects of first object network 46 is linked to the associated object class of class network 12. For example, fourth object 35 is linked to class 23 (lines), and first object 32 is linked to class 24 (roads). The analysis system calculates the class membership probability that expresses the likelihood that an object belongs to a particular class. For example, based on the brightness and orientation of the pixel locations linked to object 32, the analysis system calculates a probability that object 32 belongs to the road class 24. Each object whose class membership probability exceeds a predetermined threshold defined by the user is linked to the associated object class.

In a step 42, the analysis system generates a second object network 47 by selectively linking pixel locations 30 to objects according to process hierarchy 11 and other classes of the class network 12. Each object of second object network 47 is generated by linking the object to pixel locations associated with pixel values having similar characteristics. FIG. 5 shows that a fifth object 48 is linked to pixel locations having a similar brightness and an enclosed form. The pixel locations linked to fifth object 48 represent an island. Fifth object 48 is linked to a sixth object 49. Other pixel locations are linked to a seventh object 50 and represent water. For clarity of illustration, the links from seventh object 50 to pixel locations representing water are not shown.

In a step 43, each of the objects of second object network 47 is linked to the associated object class of class network 12. For example, sixth object 49 is linked to class 21 (land), and seventh object 50 is linked to class 22 (water). As in step 41, only those objects whose class membership probabilities exceed a predetermined threshold are linked to the appropriate object class.

In a step 44, the analysis system generates a third object network 51 by imprinting objects of first object network 46 into objects of second object network 47 such that certain pixel locations are unlinked from objects of second object network 47 and remain linked to objects of first object network 46. Thus, each imprinted pixel location is unlinked from the object of second object network 47 to which that imprinted pixel location was linked in step 42 to the extent that the imprinted pixel location was also linked to an object of first object network 46 in step 40.

FIG. 6 illustrates how objects of first object network 46 are imprinted into objects of second object network 47 to generate third object network 51. In one embodiment, most of the objects of both first and second object networks 46-47 are included in third object network 51. Where all of the pixel locations that were linked to a particular object of second object network 47 were also linked to objects of first object network 46, that particular object is absent from third object network 51. In addition, in third object network 51 some of the objects that were part of second object network 47 have fewer links to pixel locations of image layer 31. For example, object 48 of third object network 51 has fewer links to pixel locations than does object 48 in second object network 47.

Figure 7:
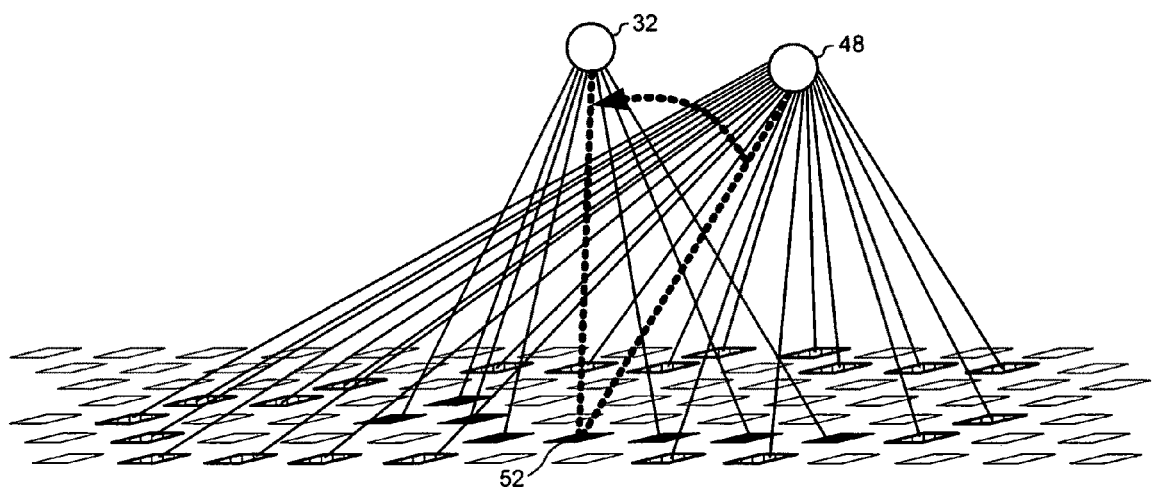
FIG. 7 is a simplified schematic diagram illustrating one pixel location being unlinked from an object in an object network into which other objects are imprinted.

FIG. 7 illustrates an example of one pixel location 52 that is unlinked in step 44 from object 48 of second object network 47 and remains linked to object 32 of first object network 46. FIG. 7 shows that after the imprinting step 44, each pixel location of image layer 31 is linked to no more than one object of third object network 51.

In one embodiment, third object network 51 is generated in step 44 by imprinting only a subset of the objects of first object network 46 into the objects of second object network 47. Only the objects of first object network 46 that fulfill a predetermined condition are imprinted. For example, the subset of imprinted objects may include only those objects of first object network 46 whose class membership probability exceeds a second predetermined threshold that is higher than the threshold used in step 41 to link objects to the road class 24. In another example, the subset of imprinted objects may include only those objects of first object network 46 for which a minimum predetermined proportion of the pixel locations that are linked to objects of first object network 46 are also linked to objects of second object network 47. Where object 48 represents an island and belongs to land class 21, only those objects belonging to road class 24 whose pixel locations are entirely co-located with pixel locations also linked to objects classified as land may be imprinted into the objects of second object network 47. In this case, the predetermined proportion of required overlapping pixel locations would be 100%.

Figure 8:
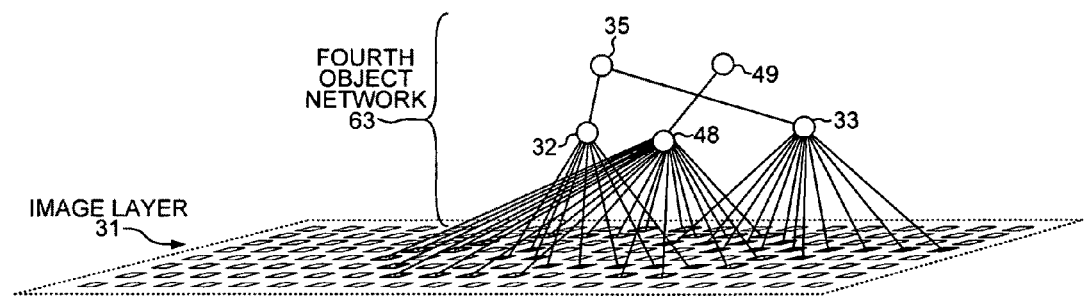
FIG. 8 is a simplified schematic diagram of a third object network generated when only those first objects that are within the boundaries of second objects are imprinted into the second objects.

FIG. 8 illustrates yet another example in which only those objects of first object network 46 that have at least one pixel location within the boundary of pixel locations of an object of second object network 47 are imprinted into the objects of second object network 47. In this example, object 48 represents the boundary of an island. Only a subset of objects of first object network 46 that belong to class 23 (lines) are imprinted into the objects of second object network 47. Only objects representing lines that have at least one pixel location within the boundary of the island represented by object 48 are imprinted into object 48. Using this embodiment of the imprinting step 44 recognizes roads on the island as well as piers protruding from the island. Long boats at anchor are distinguished from road and piers.

In another embodiment, after the imprinting step 44, a fourth object network is generated by modifying third object network 51 such that each object of second object network 47 that is linked to pixel locations that are not contiguous to one another is divided into objects of the fourth object network that are linked only to contiguous pixel locations. Thus, the fourth object network includes more objects than third object network 51. For example, where an island boundary object is imprinted over a pier object cutting the pier object into groups of contiguous pixel locations, each of the groups is linked to a separate object in the fourth object network.

In a step 45, the analysis system determines a characteristic of an object of third object network 51 by measuring the object. For example, the characteristic can be length, area, circumference, deviation from a circular shape or average pixel brightness. The area of an object can be measured by counting the number of pixel locations linked to an object. Or the circumference of an object can be determined by counting the number of pixel locations linked to the object that are contiguous to at least one pixel location that is not linked to the object. In this embodiment, the analysis system determines the length of object 32 by measuring the longest dimension of contiguous pixel locations linked to object 32. Analysis system determines that object 32 belongs to the road class 24 because object 32 has a length that exceeds a threshold, is line shaped and is entirely on land. Because the length of object 32 exceeds the threshold, object 32 is determined not to be a driveway or entrance.

In yet another embodiment, third object network 51 generated in step 44 is discarded, and first object network 46 is restored if the characteristic of the object in third object network 51 determined in step 45 does not satisfy a predetermined condition. For example, if the length of certain proportion of the objects in line class 23 is too short to be classified in the road class 24, continuous stretches of road may be obstructed by trees in the aerial photograph acquired in step 39. The process steps in the process hierarchy would then discard the inadequate third object network 51 and perform additional segmentation and processing steps on first object network 46 in order to join road segments that are separated by trees in the aerial view. The imprinting step 44 would then be performed using the improved object network.

Figure 11:
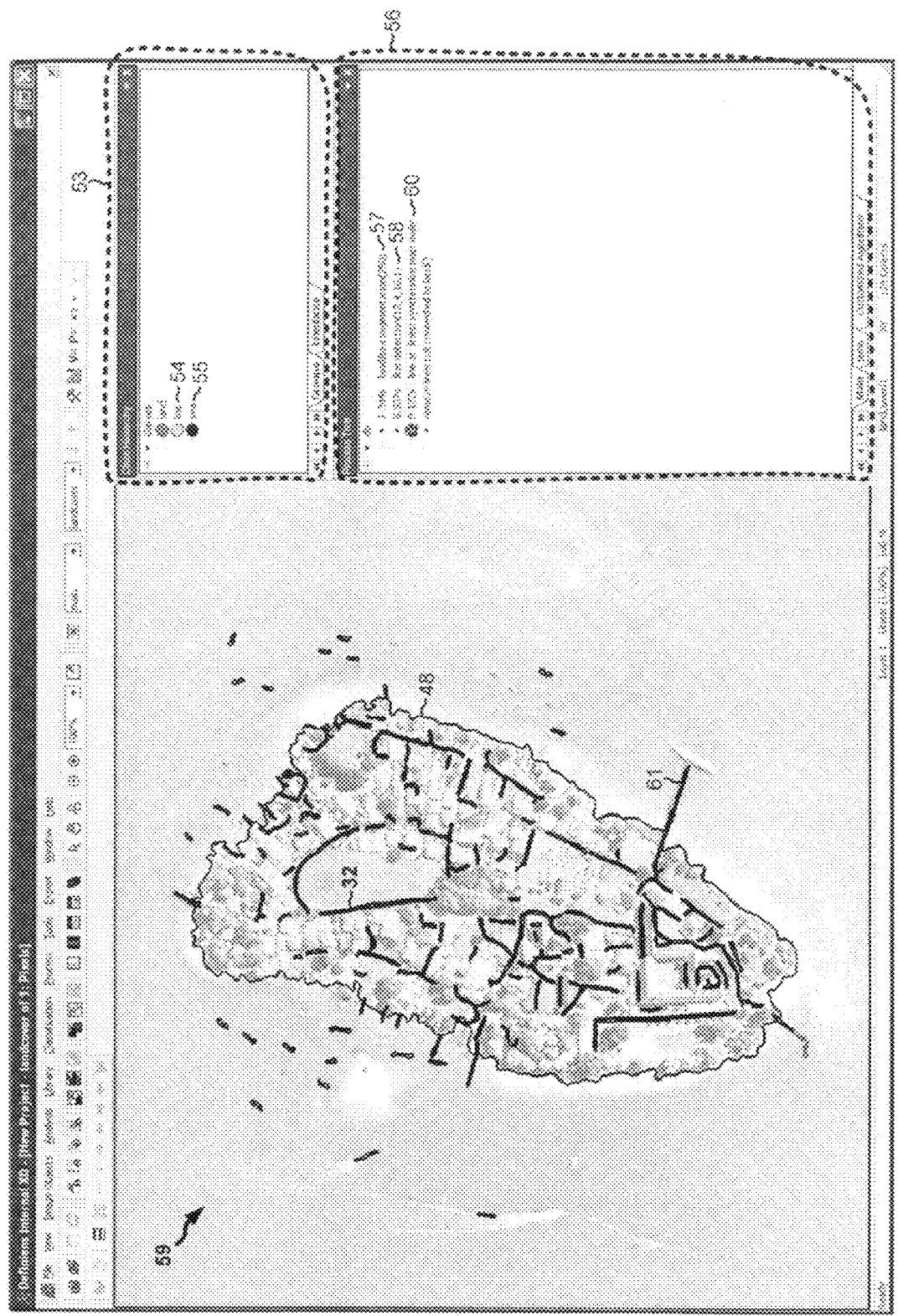
FIG. 11 is a screenshot of the graphical user interface showing the results of a step in which the analysis system imprints one plurality of objects into another plurality of objects.
Figure 12:
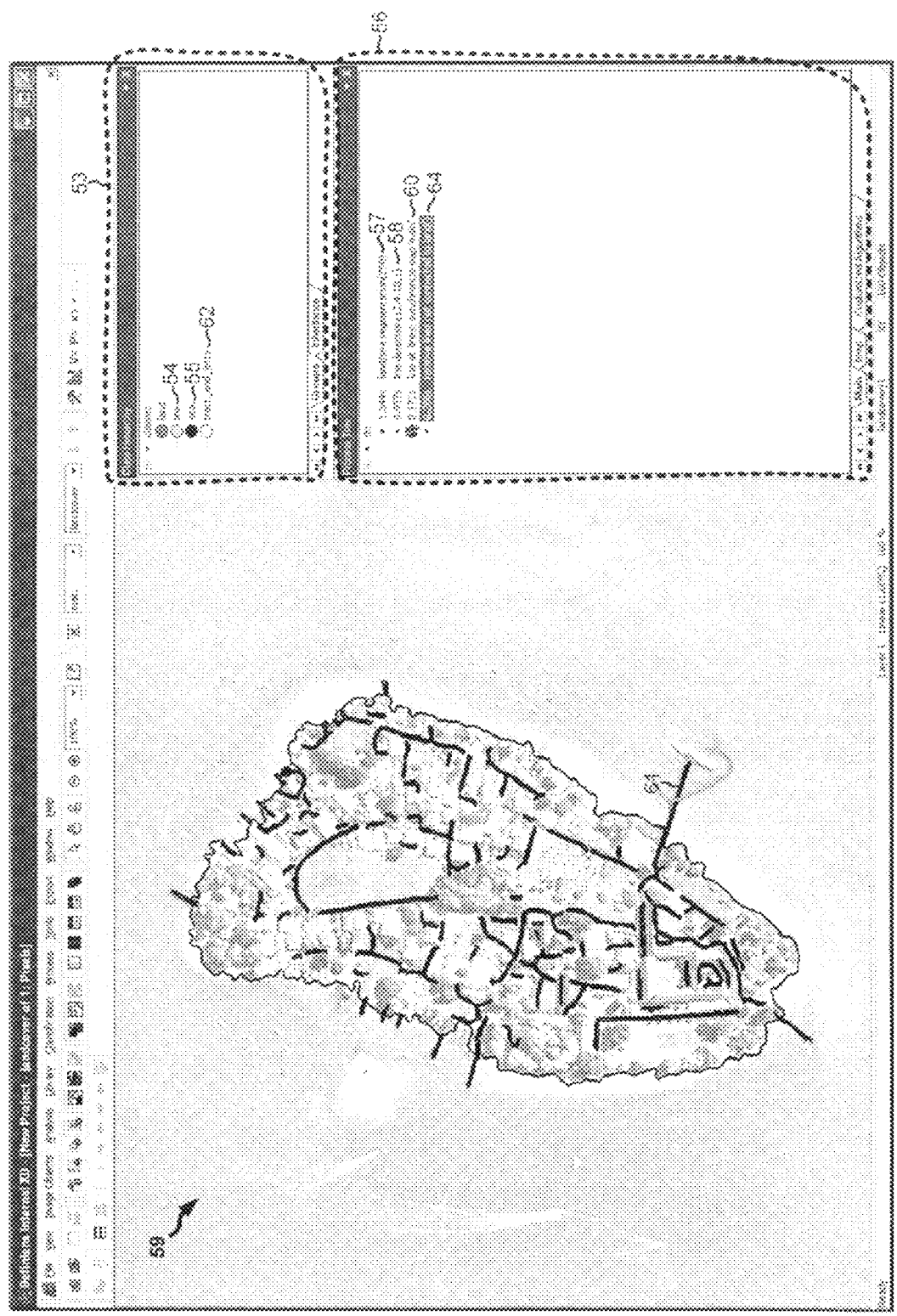
FIG. 12 is a screenshot of the graphical user interface showing the results of a subsequent step in which line objects are removed to the extent that they are not touching a land object.
Figure 13:
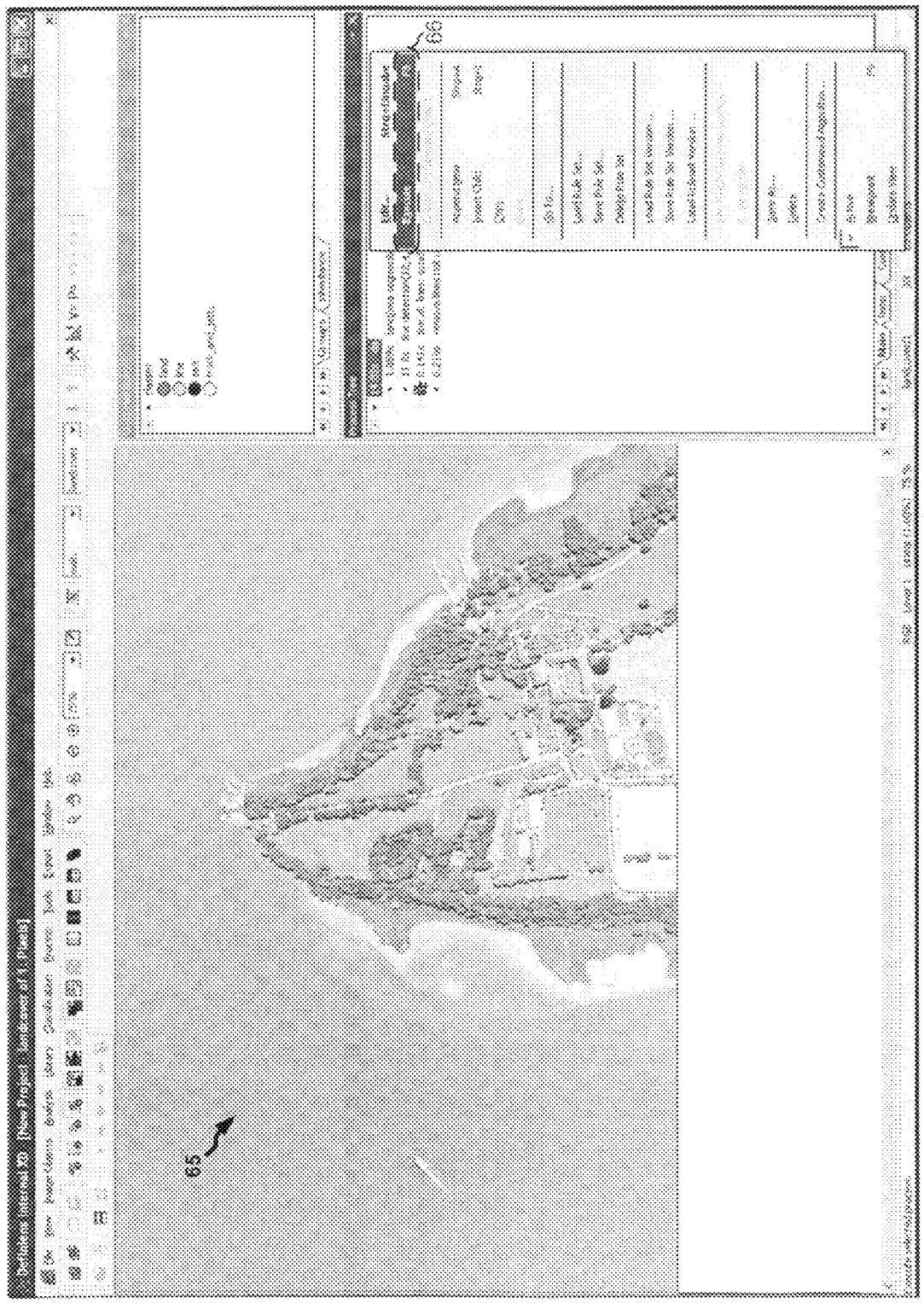
FIG. 13 is a screenshot of the graphical user interface showing a digital image upon which an image analysis script will run.

The method of steps 36-45 for analyzing digital images is now explained in relation to a geographical application. FIGS. 11 through 13 are screenshots of the graphical user interface of the analysis system in an application that generates a map from aerial photographs of an island. The method is now described as a user is presented with screenshots of the graphical user interface of the analysis system as steps 36-45 are performed.

Figure 9:
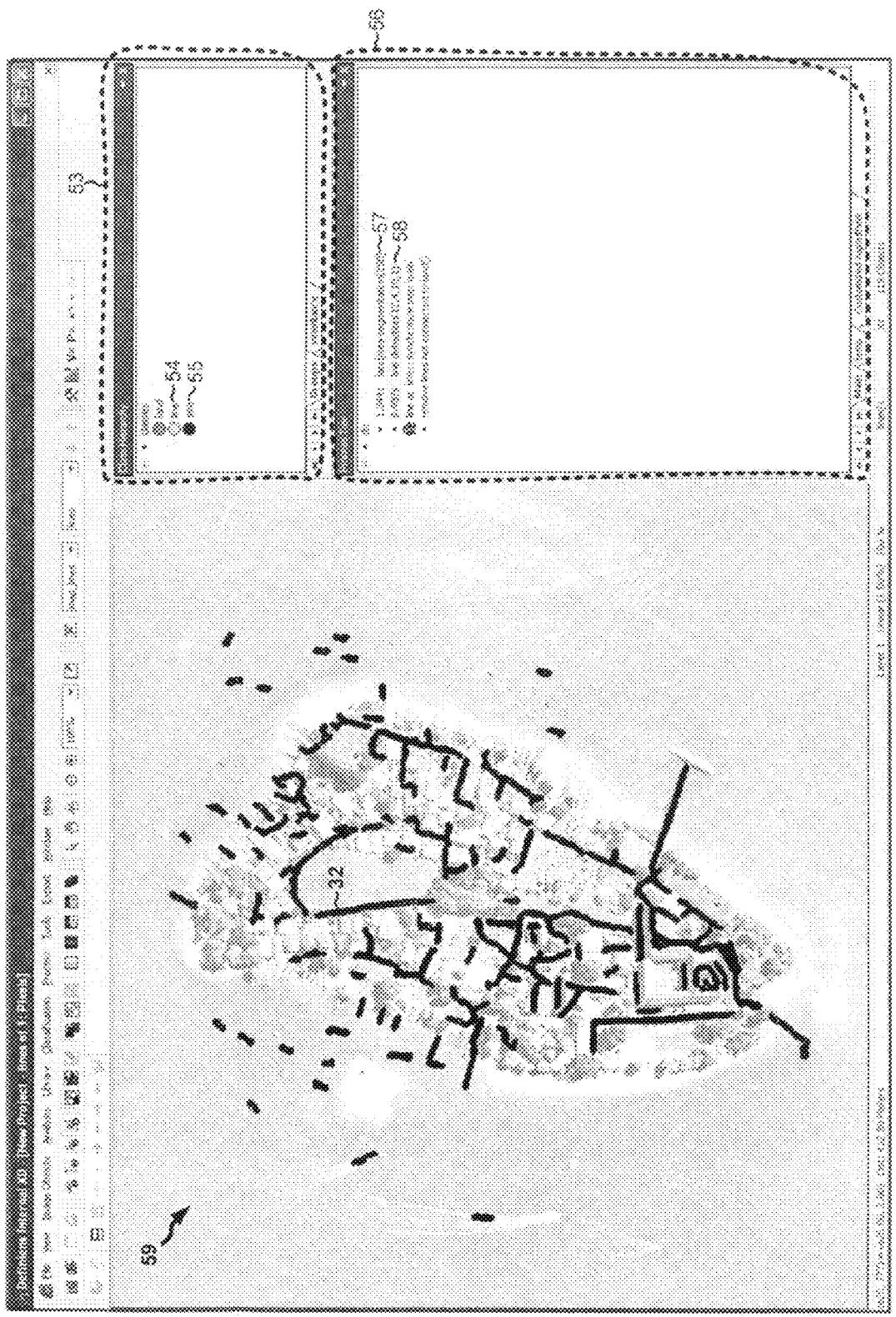
FIG. 9 is a screenshot of a graphical user interface generated by the analysis system to enable the user to specify process steps, object classes and thematic classes. Objects belonging to the class "lines" are highlighted on an image layer.

FIG. 9 shows the graphical user interface during steps 36-41. The graphical user interface is used to specify the classes of class network 12 and the process steps of process hierarchy 11. The user specifies class network 12 using a box 53 labeled "Class Hierarchy". The classes shown in box 53 describe categories of objects that the user expects to find in the digital image of the island. Class network 12 also includes the classes "helpers" and "unclassified". The analysis system assigns certain objects to "helper" classes during the iterative segmentation and classification process and before the analysis system determines the optimal class for those objects.

In step 36, the user specifies a first object class, which in this application is class 23 (lines). The user clicks on an icon 54 to obtain a pop-up window (not shown) to select a class membership function that defines the properties that an object must have to belong to the class of lines.

In step 37, the user specifies a second object class, which in this application is the land class 21. The user also specifies the water class 22. The icon 55 for the water class 22 is labeled "sea" in box 53.

In step 38, the user specifies the process steps of the process hierarchy 11. A box 56 labeled "Process Tree" of the graphical user interface is used to specify the process steps. The user inserts, deletes and edits the process steps that are listed in box 56 by clicking on the steps. Hidden process steps of process hierarchy 11 can be revealed by clicking on a "+" in the process tree in box 56. The method carried out by the steps of process hierarchy 11 illustrates how complex patterns can be recognized in a digital image faster and more accurately by imprinting objects obtained from one segmentation into objects obtained using another segmentation. The time required to perform each process step is given in seconds and milliseconds at the beginning of each process step in box 56. Box 56 shows an item 57 representing a the process step of segmenting land from water takes, which takes 1.344 seconds. An item 58 represents the process step that classifies objects as belonging to the line class. The classification of objects into the line class takes 8,937 seconds.

In step 39, the analysis system acquires the pixel values of an image layer. Each of the pixel locations 30 is associated with an acquired pixel value. For example, a pixel location corresponds to a memory location in which an acquired digital pixel value is stored. FIG. 9 shows that the analysis system has acquired a digital image 59 of an island with buildings, roads and vegetation surrounded by boats at anchor.

In step 40, the analysis system generates first object network 46 by linking pixel locations of the image layer to objects. Pixel locations are linked to objects according to the applicable process step and class. Superimposed upon image layer 31 of digital image 59 are the objects of first object network 46 that have been classified in line class 23 as a result of the process step performed in item 58. A line representing object 32 is labeled.

In step 41, the objects classified as lines are linked to line class 23 in network structure 10.

Figure 10:
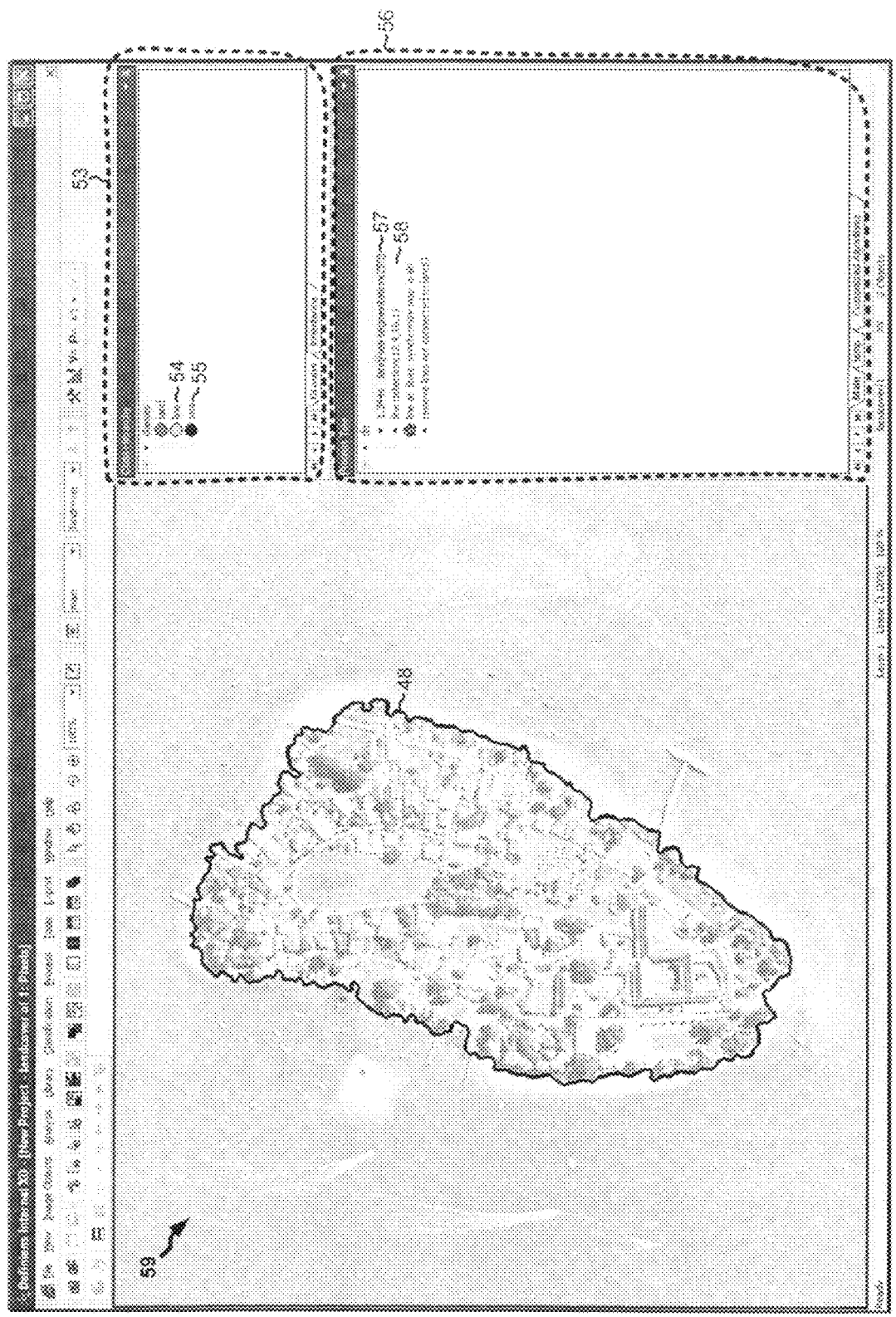
FIG. 10 is a screenshot of the graphical user interface in which objects belonging to the class "land" are highlighted on an image layer.

FIG. 10 shows the results of step 42, in which the analysis system has generated second object network 47 by linking pixel locations of the image layer to objects classified in the land class 21. Superimposed upon image layer 31 of digital image 59 are the objects of second object network 47 that have been classified in land class 21 as a result of the process step performed in item 57. The boundary of object 48 in land class 21 is labeled in digital image 59.

In step 43, the objects classified as land are linked to land class 21 in network structure 10.

FIG. 11 shows the results of step 44, in which the analysis system imprints one plurality of objects into another plurality of objects. Third object network 51 is generated by imprinting the objects of first object network 46 into the objects of second object network 47 such that pixel locations that were linked to both first object network 46 and second object network 47 are unlinked from the objects of second object network 47. Superimposed upon image layer 31 of digital image 59 are the objects of third object network 51 that are generated according to the process step performed in an item 60 of box 56. A line representing object 32 is labeled. Pixel locations that were linked to object 48 of second object network 47 as well as to an object of first object network 46 have been unlinked from object 48. For example, pixel locations of object 48 in second object network 47 that cut through an object 61 of first object network 46 are unlinked from object 48 in third object network 51.

In one embodiment, the user selects the imprinting step 44 by selecting the step "synchronize map" from a pop-up window listing process step options. Item 60 of box 56 shows that the user has selected the "synchronize map" step that includes an algorithm for "imprinting". When selecting the "synchronize map" step, the user defines a target region into which source objects are to be copied. In one implementation, the objects in the target region are overwritten in order to conserve memory space.

In step 45, a characteristic of an object of third object network 51 is determined by measuring the object. For example, object 61 is classified as belonging to the pier class 25 because object 61 is classified as a line and is surrounded party by water and partly by land. In one embodiment, the length of pier 61 that extends into the water is determined by counting the number of pixel locations of object 61 that are contiguous to at least one pixel location linked to an object classified as water.

FIG. 12 shows an icon 62 in box 53 that is used to select a class membership function that defines the properties of objects in class 25 of piers. Icon 62 is labeled "track_and-jetty". FIG. 12 also illustrates the results of a subsequent step in which line objects are removed from third object network 51 to the extent that those objects are not enclosed by or at least touching the boundary of object 48. In a first embodiment, a fourth object network 63 is generated by removing some objects from third object network 51. Fourth object network 63 is generated according to the process step performed in an item 64 of box 56. The objects of fourth object network 63 are superimposed upon image layer 31 of digital image 59 in FIG. 12.

In a second embodiment, an object network identical to fourth object network 63 is generated by imprinting only a subset of objects of first object network 46 into second object network 47. In effect, objects are removed before the imprinting step in the second embodiment. Only objects of first object network 46 representing lines that have at least one pixel location within the boundary of object 48 of second object network 47 are imprinted into object 48. For example, objects that represent long boats at anchor are distinguished from roads and piers and removed from first object network 46 before the imprinting step 44. Fourth object network 63 is illustrated schematically in FIG. 8.

In another implementation of the second embodiment, the subset of objects from first object network 46 that are imprinted includes only those objects for which a minimum predetermined proportion of the pixel locations linked to those objects are also linked to object 48 of second object network 47. In this implementation, object 48 is linked not only to boundary pixel locations, but also to all pixel locations within the boundary.

The analysis system generates an image analysis script after the user uses the graphical user interface to specify class network 12 and process hierarchy 11. The image analysis script is then run on newly acquired pixel values and analyzes a digital image according to the specified process steps and classes without additional input from the user. For example, the analysis system automatically generates a map of roads and piers on a newly acquired digital image of an island. The image analysis script is executes on one or more processors of a computer, generates at least two object networks, generates a third object network by imprinting certain objects of the first network into objects of the second network, and then determines a characteristic of an object of the third network.

FIG. 13 shows an image layer of a newly acquired digital image 65 upon which the image analysis script will be run. The user of the analysis system executes the image analysis script by selecting an "Execute" command 66 from a pull-down menu.

Figure 14:
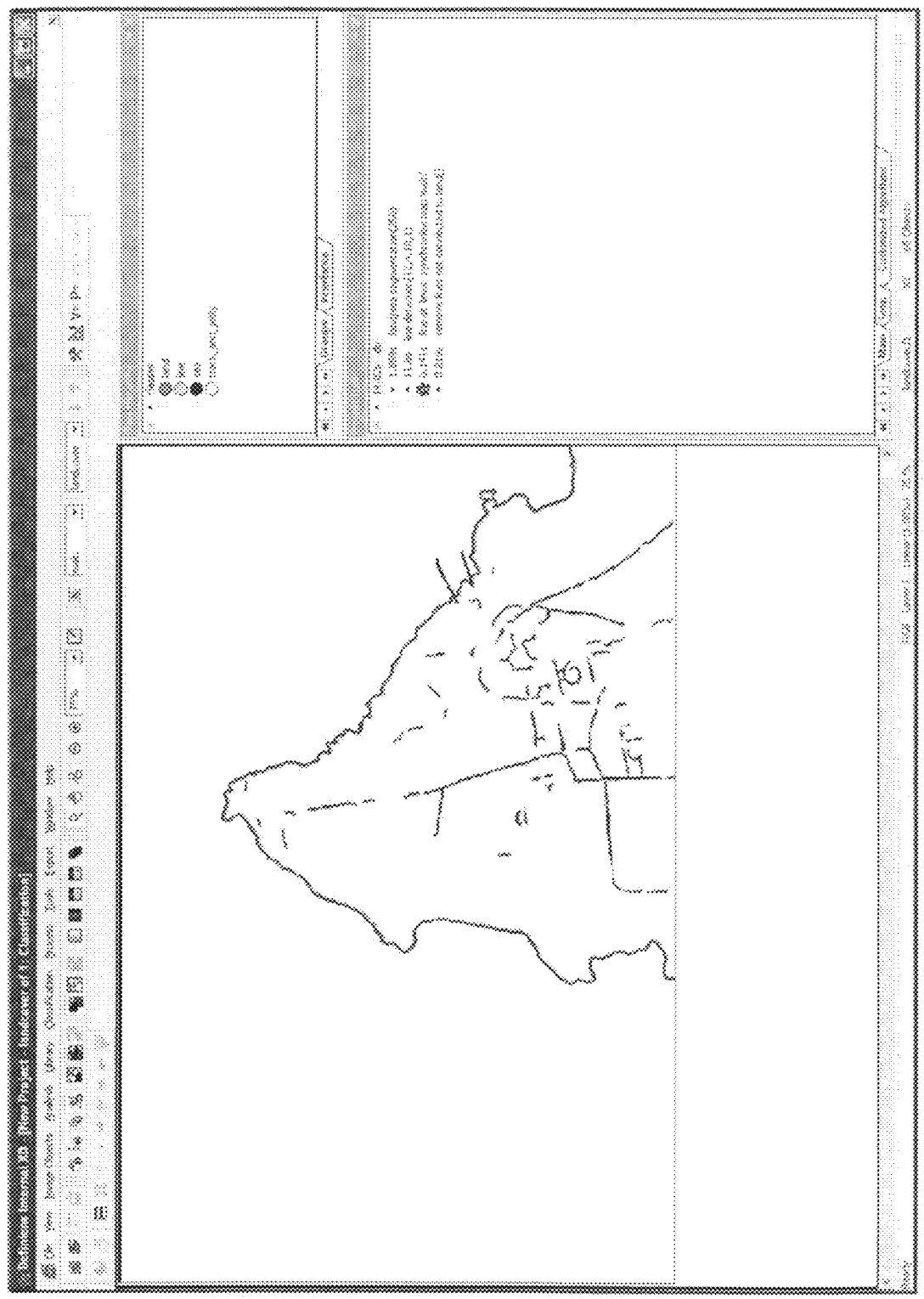
FIG. 14 is a screenshot of the graphical user interface showing a map generated by running the image analysis script.

FIG. 14 shows the map generated by running the image analysis script. The roads and piers have been identified and distinguished from boats and objects in the water.

The method of steps 36-45 for analyzing digital images is now explained in relation to a medical application. FIGS. 15 through 18 are views of image layers at various stages of the execution mode of the analysis system in which the image analysis script is executed.

Figure 15:
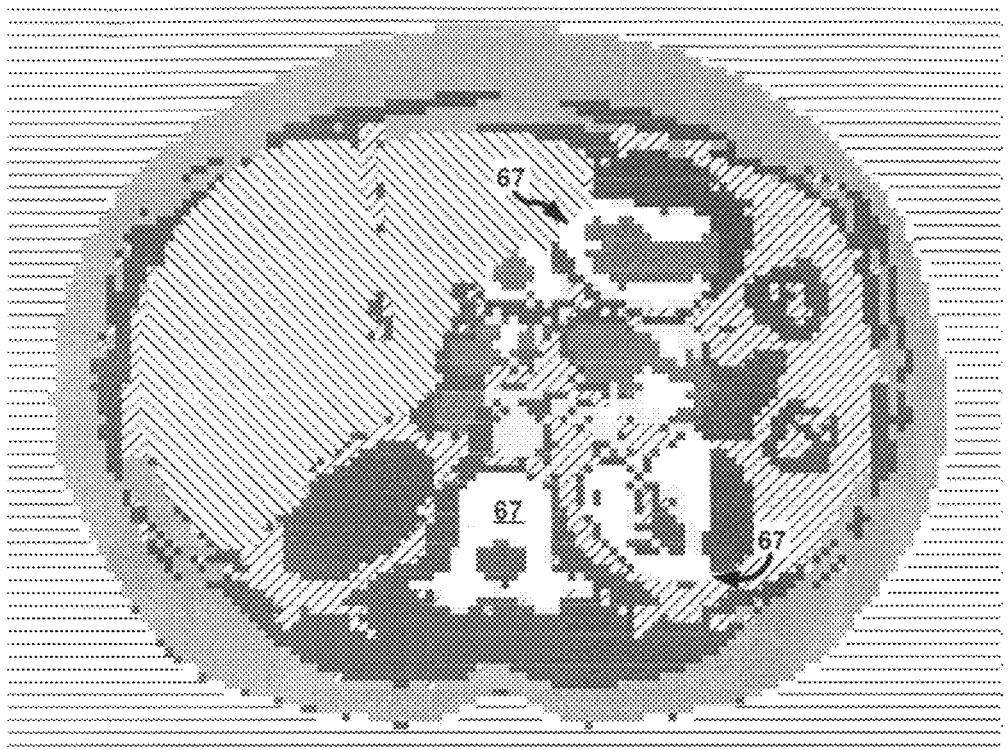
FIG. 15 shows a digital image of a cross section of a human torso in which objects in the image have been classified by an image analysis script.

FIG. 15 is a digital image of a cross section of a human torso. In one embodiment, the digital image is acquired using magnetic resonance imaging (MRI). The segmentation of step 40 is performed on a low resolution of the image layer in order to reduce the time required to perform the calculations used to link pixel locations to objects. Individual pixel locations are apparent. The white areas shown in FIG. 15 represent pixel locations that are linked to objects of a second object network 67. The objects of second object network 67 are classified as bone.

Figure 16:
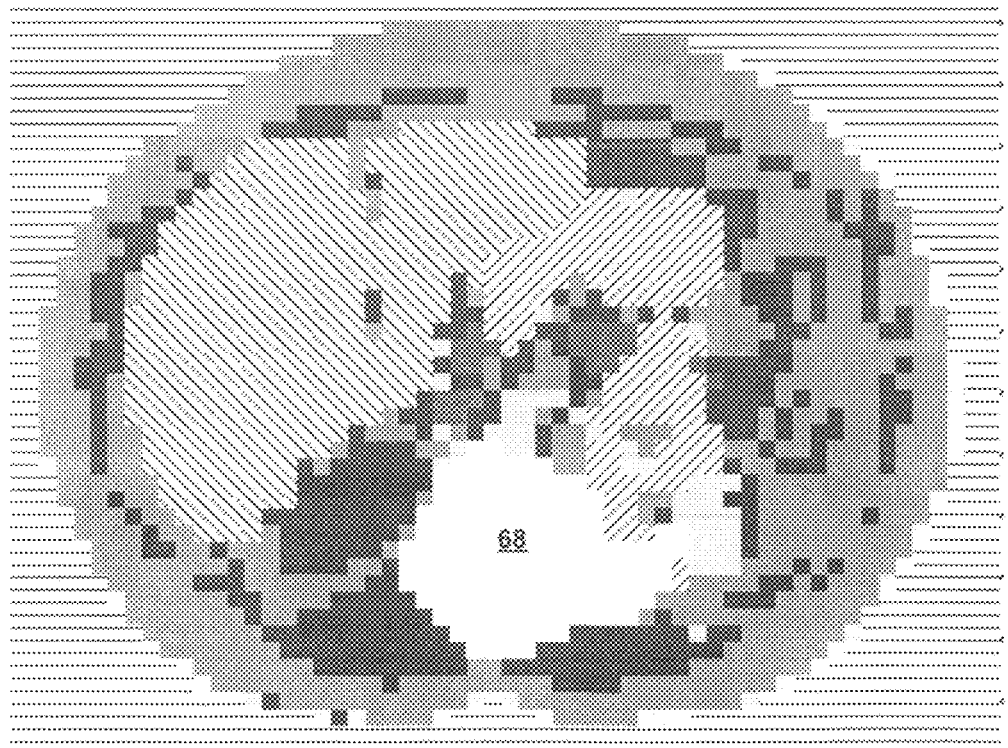
FIG. 16 shows a digital image of a cross section of the human torso in which objects belonging to an area of interest have been classified using an even lower resolution image than in FIG. 15.

FIG. 16 shows the results of a second segmentation performed in step 42. A first object network 68 is generated by linking selected pixel locations to objects classified as the spine area. The segmentation of step 42 is performed on an even lower resolution of the image layer in order to reduce the calculation time. The pixel locations in FIG. 16 are four times as large as those in FIG. 15. Thus, four pixel locations of the image layer of FIG. 16 fit inside each pixel location of the image layer of FIG. 15. Segmentation at a low resolution is used in step 42 to locate a region of interest with fewer computations.

Figure 17:
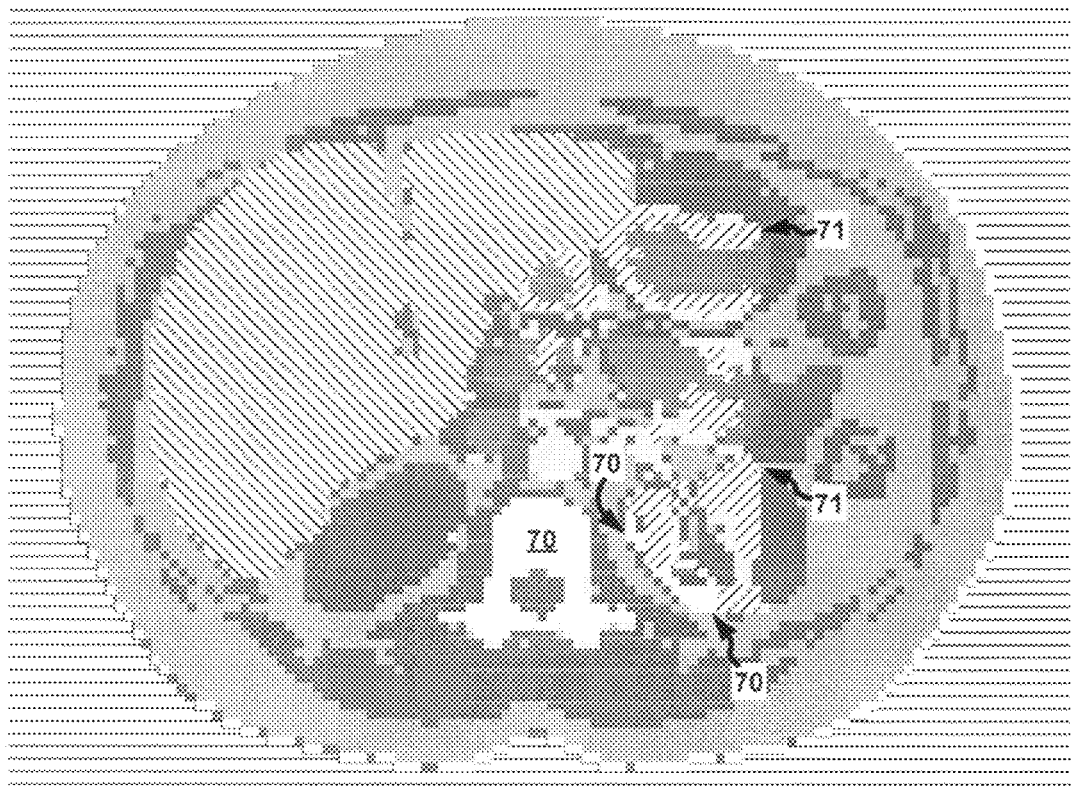
FIG. 17 shows a digital image of a cross section of the human torso in which a third object network has been generated by imprinting the objects of FIG. 15 into the objects of FIG. 16.

FIG. 17 shows the pixel locations linked to objects in a third object network 69 generated by the imprinting of step 44. The lighter pixel locations in the middle of the torso belong to third object network 69 and are generated by imprinting objects of first object network 68 into objects of second object network 67. The imprinting step generates third object network 69 such that pixel locations that were linked both to objects of first object network 68 as well as to objects of second object network 67 are now linked in third object network 69 only to the corresponding objects of first object network 68. The corresponding objects of second object network 67 that become part of third object network 69 are linked to those pixel locations that were linked to objects of second object network 67 but not to objects of first object network 68. The imprinting of the spine area object into bone objects is analogous to the imprinting of the island object into the line objects in FIGS. 6 and 11. (In FIG. 6, the line objects were imprinted into the island object.) The objects in third object network 69 include bone objects 70 that fall within the boundary of the spine area object of first object network 68, as well as bone objects 71 that fall outside of the boundary.

Figure 18:
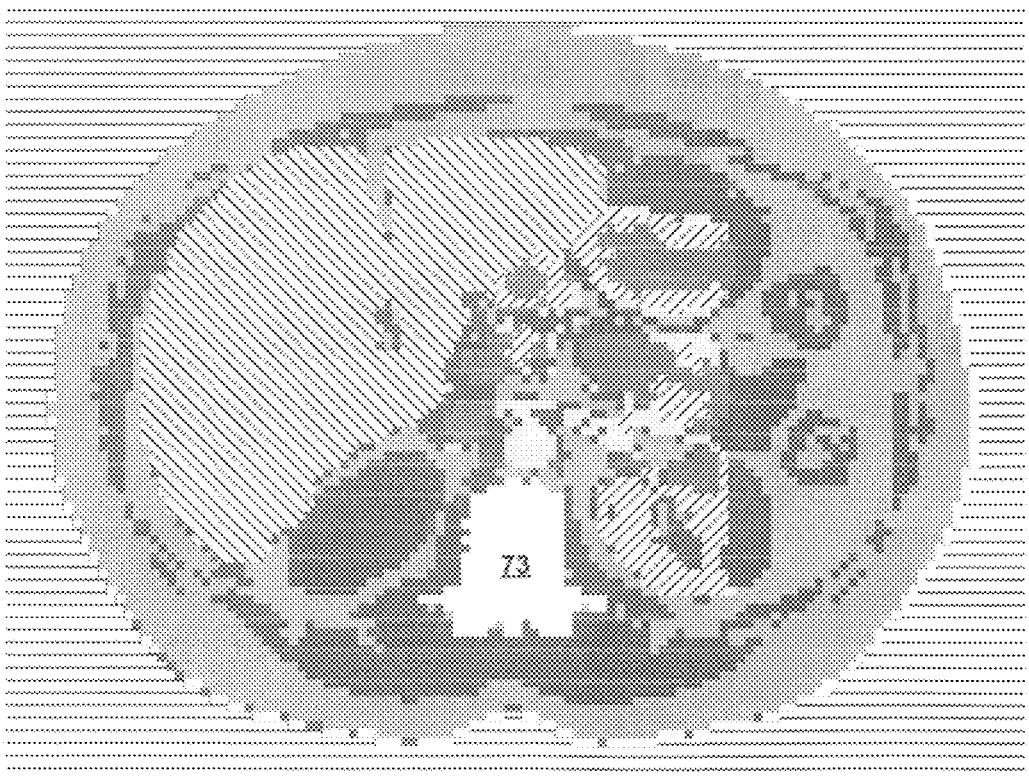
FIG. 18 shows a digital image of a cross section of the human torso in which the objects of the third object network of FIG. 17 have been further processed to more accurately identify an area of interest around the spine.

FIG. 18 shows the results of a further processing step 72 on the bone objects 70. In prior step 45, the bone objects 70 were measured, and the object with the largest area was identified. For example, area can be calculated by counting the number of contiguous pixel locations. The largest object is used in step 72 to generate an object 73 that identifies a more accurate area of interest around the spine.

Figure 19:
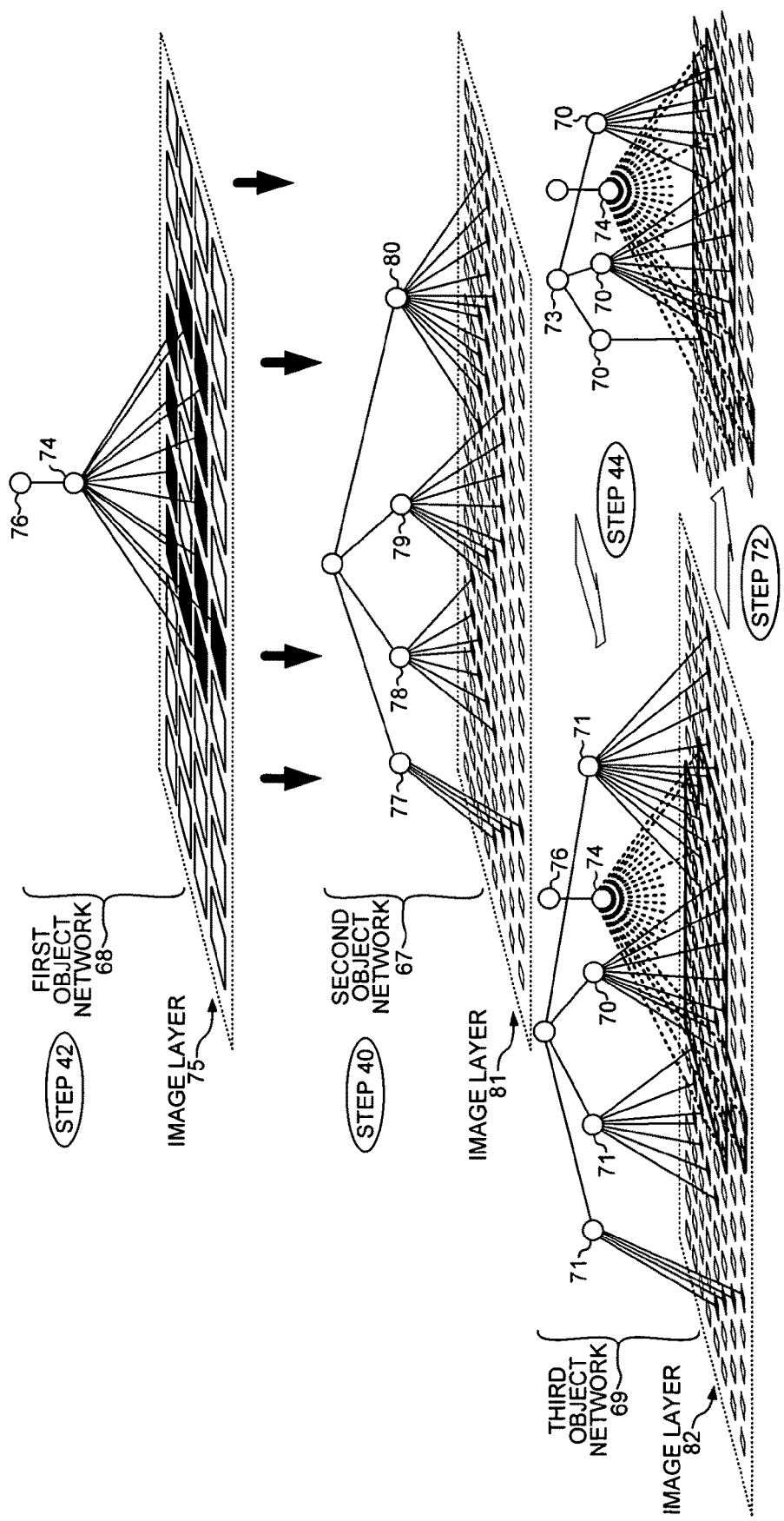
FIG. 19 is a simplified schematic diagram illustrating how objects linked to a lower resolution image layer are imprinted into objects linked to a higher resolution image layer.

FIG. 19 illustrates how objects of first object network 68 are imprinted into objects of second object network 67 to generate third object network 69. In this embodiment, a spine area object 74 is linked in step 42 to pixel locations on a lower resolution image layer 75. Spine object 74 is also linked to a general bone object 76. Second object network 67 includes specific bone objects 77-80 that are linked to pixel locations on a higher resolution image layer 81 the represent specific bones. Four pixel locations of higher resolution image layer 81 fit inside one pixel location of lower resolution image layer 75.

The imprinting step 44 generates third object network 69 such that pixel locations that were linked both to objects of first object network 68 as well as to objects of second object network 67 are now linked in third object network 69 only to the corresponding objects of first object network 68. In one implementation, lower resolution image layer 75 is upscaled before first object network 68 is imprinted into second object network 67 on higher resolution image layer 81. Thus, after imprinting step 44, the boundary of spine area object 74 is linked to more pixel locations on an image layer 82 of third object network 69 than the fewer pixel locations on image layer 75 to which the boundary of spine area object 74 was linked. The corresponding objects of second object network 67 that become part of third object network 69 are linked to those pixel locations on image layer 82 that correspond to pixel locations on image layer 81 to which specific bone objects 77-80 are linked, but not to those pixel locations on image layer 82 that correspond to pixel locations of the rescaled boundary of spine area object 74 of first object network 68. The objects in third object network 69 include bone objects 70 that fall within the boundary of spine area object 74, as well as bone objects 71 that fall at least partly outside of the boundary.

In further processing step 72, only portions of specific bone objects 77-80 that fall completely within the rescaled boundary of spine area object 74 on image layer 82 are retained as bone objects 70. Object 73 generated in step 72 more accurately identifies bone objects within the area of interest around the spine.

Figures 20A, 20B, 20C:
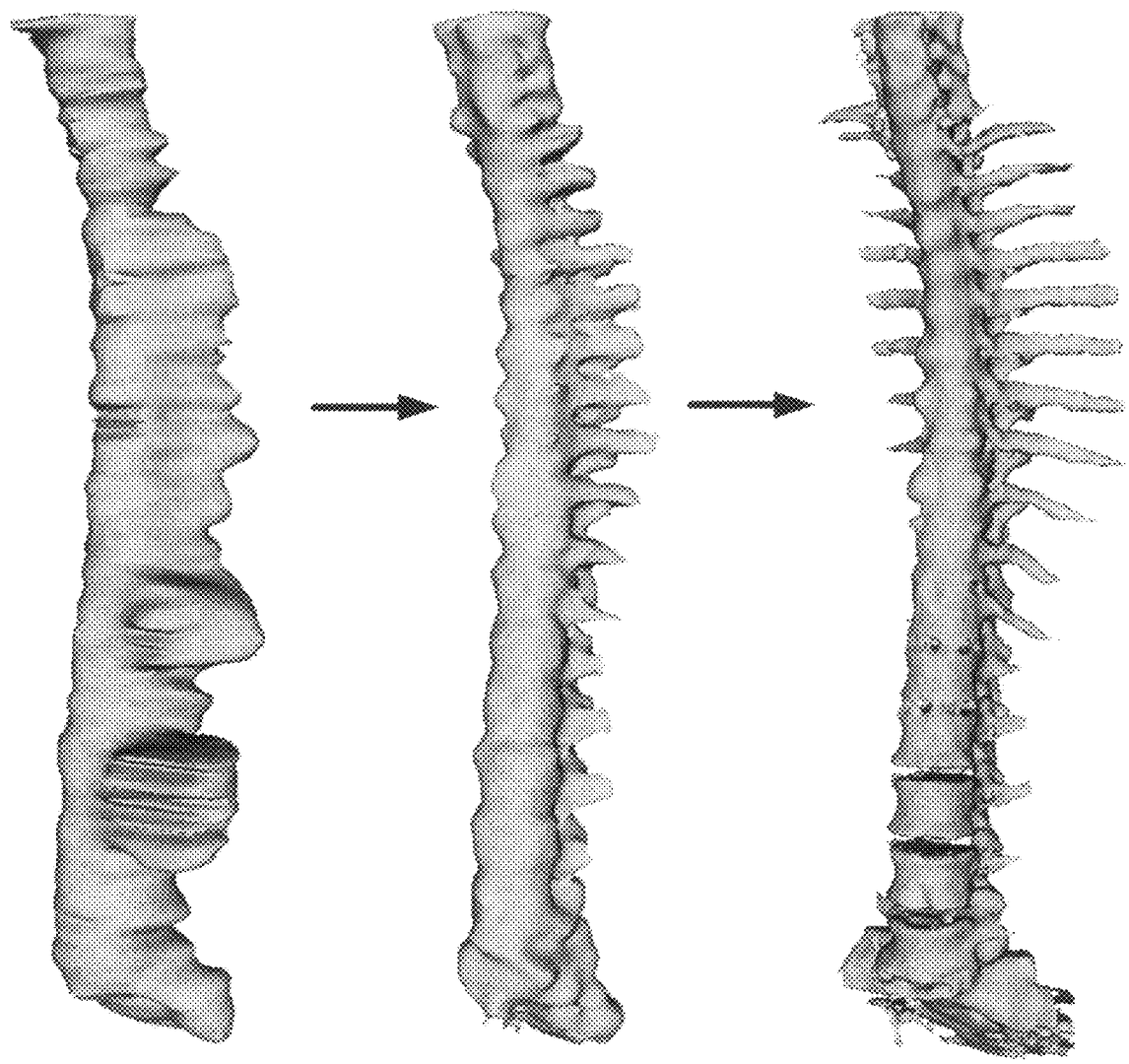
FIGS. 20A-C show three-dimensional images of the spine generating by the analysis system using the imprinting step.

FIGS. 20A-C illustrate how the imprinting step 44 is used to analyze a target pattern more quickly. FIGS. 19A-C also show that the imprinting step 44 can be used to process stacks of image layers forming three-dimensional digital images of objects. In the example of FIGS. 20A-C, the image analysis script is used to generate a three-dimensional image of a patient's spine from a series of CT images taken of slices of the patient's torso. Because a contrast bolus is usually applied to enhance the visualization of blood vessels, it is difficult for an automated system to distinguish bone from blood vessels according to the brightness of pixel locations. First, an area (or volume) of interest is determined by generating a first object network from relatively low-resolution image layers. By using low resolution image layers, small blood vessels are hardly visible and therefore easily distinguishable from the spine bone. The analysis system generated the object shown in FIG. 20A in four seconds. Then, objects classified as bone and generated from image layers with double the resolution of the first object network are imprinted into the area of interest, and bone objects are identified within the area of interest, as shown in FIG. 20B. The analysis system generated the object shown in FIG. 20B in an additional two seconds. Finally, the identified bone objects in the area of interest are further processed using image layers having an additional doubling of their resolution. With increased resolution, the number of pixels increases, and the number of calculations required to classify and segment objects increases. Thus, it takes an additional five seconds for the analysis system to generate the object shown in FIG. 20C.

The object shown in FIG. 20C is, however, generated much faster and more accurately than with prior image analysis techniques. First, the object network defining the area of interest and the object network defining the target objects, e.g., bones or lines, can be generated concurrently by performing the calculations on different processors. Second, some of the object networks, such as those defining areas of interest, can be classified faster using lower resolution image layers. Third, classification and segmentation that are computationally intensive can be performed only on objects that are imprinted within other objects. The image analysis can be completed faster by performing calculations on fewer objects. Finally, the results of the image analysis are improved because alternative classification paths can be pursued independently of one another without overwriting the results of the other classification path until the imprinting step. For example, one object network can be generated in many steps performed on low resolution image layers, while another object network is concurrently generated in a few, more complex steps performed on higher resolution image layers. Then one object network is imprinted into the other and combines the results obtained in each classification path.

Figure 21:
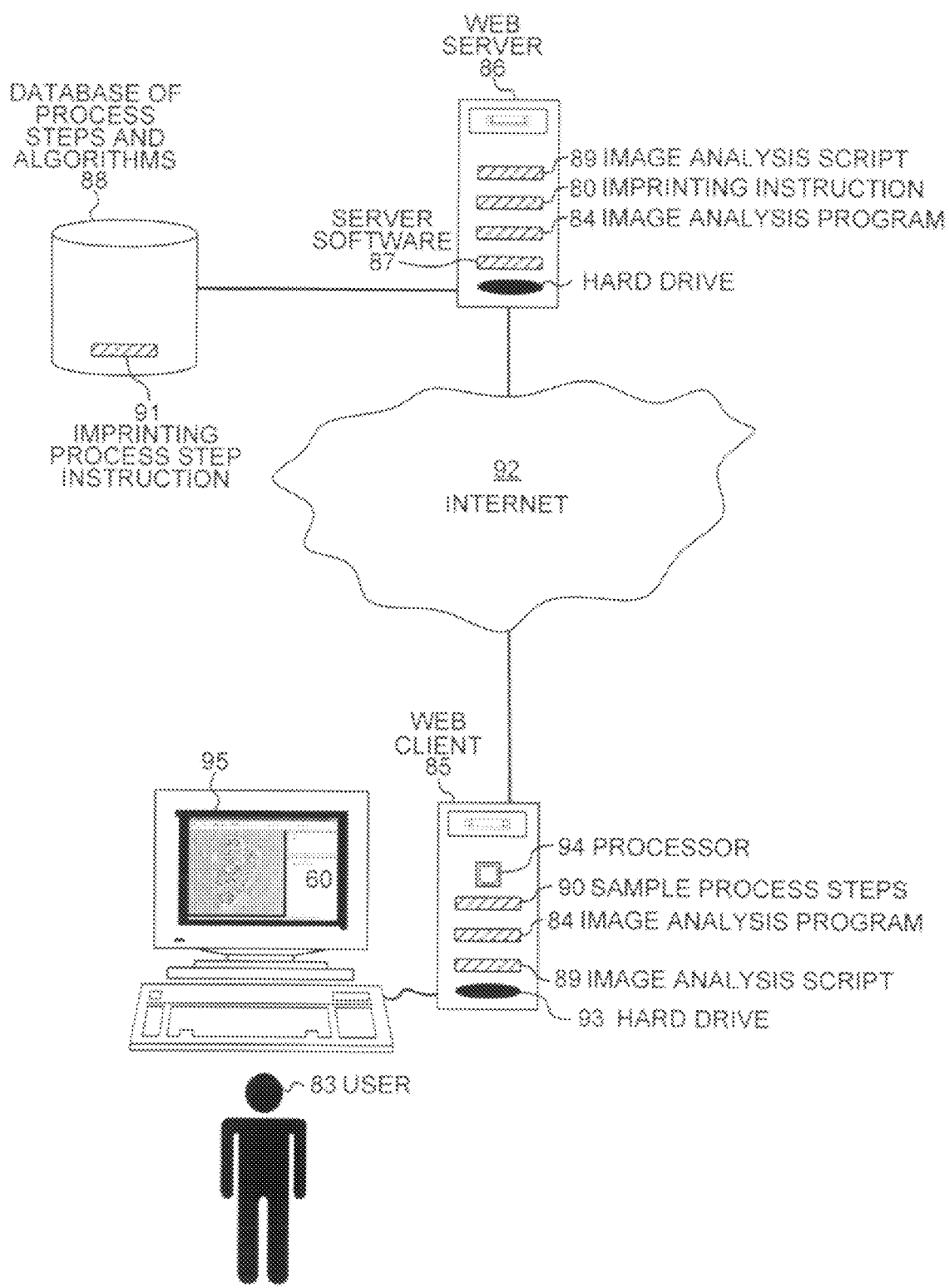
FIG. 21 is a diagram showing how the analysis system is implemented by a user generating an image analysis script using an image analysis program.

FIG. 21 illustrates how the analysis system is implemented. In one embodiment, a user 83 downloads an image analysis program 84 onto a web client 85 from a web server 86. The maker of the image analysis program uses server software 87 to distribute image analysis program 84, pre-configured image analysis scripts and sample process step instructions. The maker of image analysis program 84 has a database of preformulated process steps and algorithms 88. In another embodiment, the process steps are incorporated into the image analysis program 84. Image analysis program 84, a pre-configured image analysis script 89 and sample process step instructions 90, including the imprinting process step instruction 91, are delivered to the user via the Internet 92.

In the specification mode, the user edits the preformulated image analysis script 89 or creates a new script using image analysis program 84 and sample process steps 90 downloaded onto the hard drive 93 of the user's computer. For example, the user 83 revises the pre-configured image analysis script 89 by selecting the imprinting step instruction labeled "synchronize map" 60 from a pop-up window generated by image analysis program 84 executing on a processor 94 of the user's computer. The pop-up window is displayed on a display 95 of the user's computer, as shown in FIG. 11. In the execution mode, user 83 then executes the revised image analysis script on pixel values of a newly acquired digital image. Image analysis script 89 includes instructions that are executed by processor 94. Before being loaded into random-access memory (RAM) and executed by processor 94, the image analysis script 89, the image analysis program 84 and the imprinting process step instruction 91 are stored on hard drive 93 of the user's computer. In one specific embodiment, hard drive 93 is a disk drive that is a computer-readable medium having computer-executable instructions for analyzing a digital image by performing the imprinting step. In another embodiment, the maker of image analysis program 84 distributes image analysis script 89, image analysis program 84 and imprinting process step instruction 91 on an optical compact disc (CD).

Where one or more exemplary embodiments are implemented in software, the functions may be stored as one or more instructions or code on a computer-readable medium. A storage medium may be any available medium that can be accessed by a computer. By way of example, and not limitation, such computer-readable media can comprise RAM, ROM, EEPROM, CD-ROM or other optical disc storage, magnetic disk storage or other magnetic storage devices, or any other medium that can be used to carry or store desired program code in the form of instructions, data structures or scripts and that can be accessed by a computer. Also, any connection is properly termed a computer-readable medium. For example, if software or a script is transmitted from a website, server, or other remote source using a coaxial cable, fiber optic cable, twisted pair or digital subscriber line (DSL), then the coaxial cable, fiber optic cable, twisted pair or DSL are included in the definition of medium. Disk and disc, as used herein, includes compact disc (CD), laser disc, optical disc, digital versatile disc (DVD), floppy disk and blu-ray disc, where disks usually reproduce data magnetically and discs usually reproduce data optically with lasers. Combinations of the above should also be included within the scope of computer-readable media. An exemplary computer-readable storage medium is coupled to a processor such the processor can read information from, and write information to, the storage medium. In the alternative, the storage medium may be integral to a processor or to a multi-processor computer. The processor and the storage medium may reside in an ASIC. In the alternative, the processor and the storage medium may reside as discrete components in a user terminal.

In another embodiment, the imprinting step of the method of FIG. 4 is used to improve the quality of maps generated from satellite images of urban areas. The imprinting step is used to generate roofs of building that appear as polygons with all right angles. Satellite images of urban areas taken at less than very high resolution depict roofs as irregular shapes, especially when the edges of the roofs are not oriented along the same Cartesian axes as are the pixel locations of the digital satellite image. In a substep of process step 44 of the method of FIG. 4, an object of the first object network is scaled, rotated and translated before being imprinted into the second plurality of objects. In this embodiment, the object represents the roof of a house.

Figure 22:
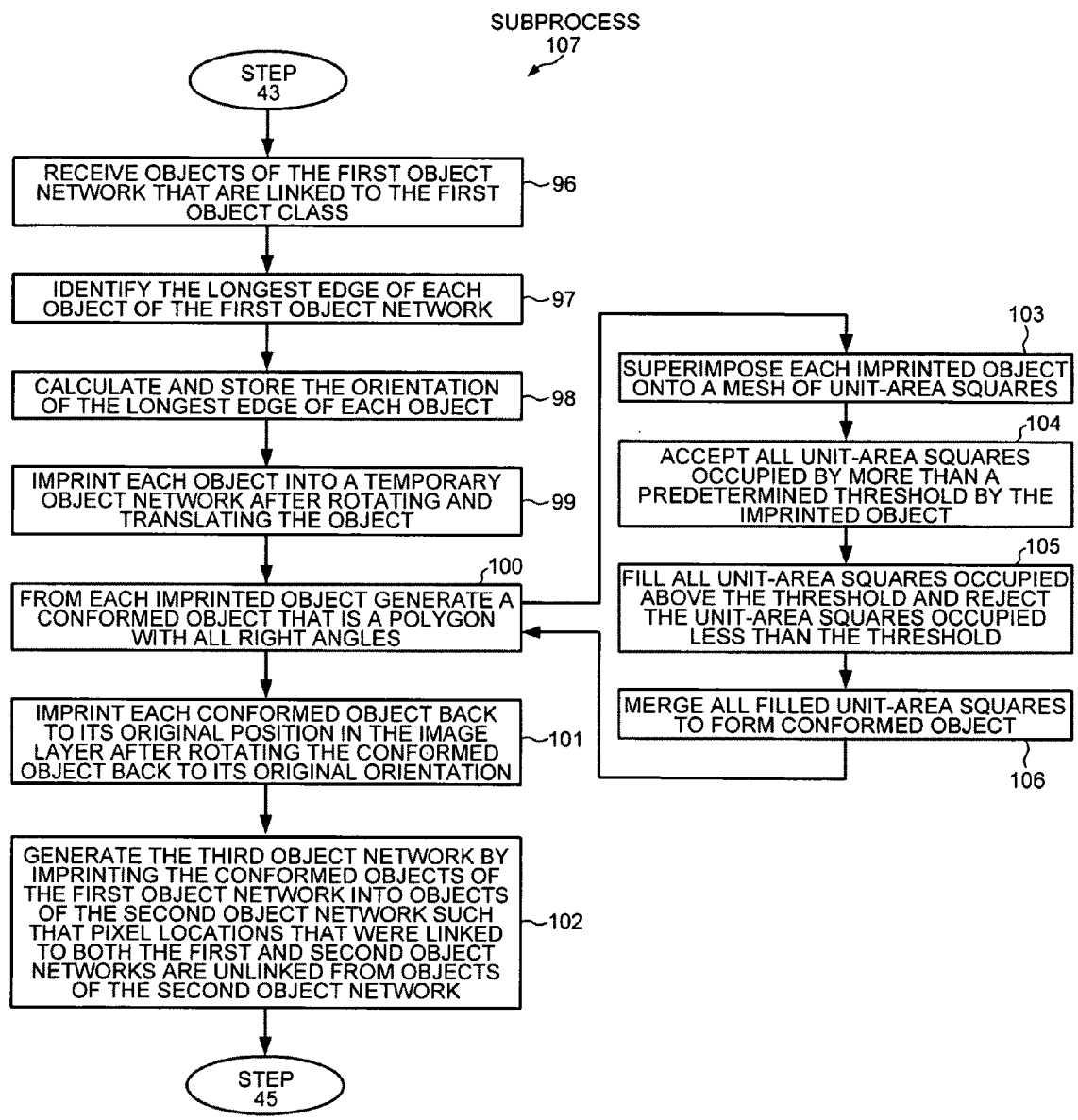
FIG. 22 is a flowchart of steps for conforming objects of a first object network before those objects are imprinted into objects of a second object network.

FIG. 22 is a flowchart illustrating steps 96-106 of a sub-process 107 by which the analysis system conforms objects representing roof shapes before those objects are imprinted back into other objects in the neighborhood of the houses. After the roof shapes are conformed into polygons with all right angles, the conformed roof shapes are imprinted back into the neighborhood such that each conformed roof object is linked to those pixel locations of a new image layer that correspond to the pixel locations of a rotated, rescaled and translated image layer on which the conformed roof object was generated. In addition, the objects of the neighborhood that become part of a new object network are not linked to those pixel locations on the new image layer that are linked to the conformed roof objects. After the roof shapes are conformed into polygons with all right angles, the links from pixel locations on the new image layer to data objects representing the neighborhood are missing to the extent that corresponding pixel locations on the rotated, rescaled and translated image layer were linked to conformed roof objects.

Figure 23:
FIGS. 23-30 are views of image layers at various stages of the execution mode of the analysis system in which the roof shapes are conformed and imprinted.

The steps of FIG. 22 are now described in relation to the operation of the analysis system as shown in FIGS. 23-30. FIGS. 23-30 show image layers at various stages of the execution mode of the analysis system in which the roof shapes are conformed and imprinted. FIG. 23 shows an image layer 108 acquired in step 39 of FIG. 4 upon which the imprinting step 44 is being performed. Image layer 108 is a satellite image of houses in a neighborhood near two intersecting streets.

Figure 24:
Figure 25:
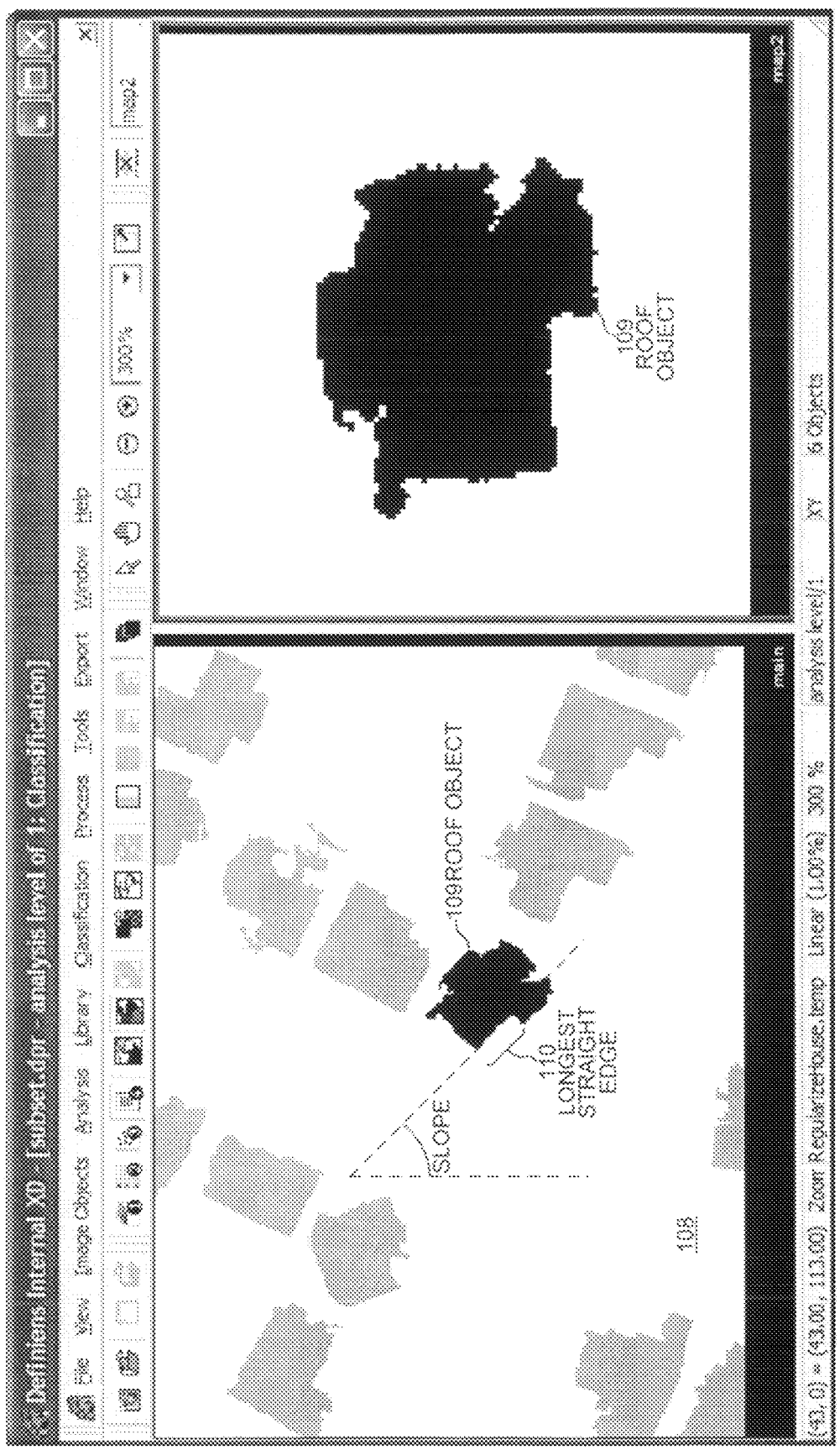

In a first step 96, the objects of first object network 46 that were linked in step 41 to a first object class are used as the input for subprocess 107. In this embodiment, the first object class represents roofs of houses in a neighborhood. FIG. 24 shows the objects of first object network 46 that are classified as roofs. An exemplary roof object 109 is shown. The objects classified in the first object class appear as irregular shapes partly because the resolution of the satellite image of the neighborhood is insufficient to show edges of the roofs that are not aligned with the Cartesian axes of the digital image as straight lines. FIG. 25 is a screenshot of the graphical user interface generated by the analysis system at step 96. The window at the left of the graphical user interface shows roof object 109 in the neighborhood of other roof objects. The window on the right shows a rotated and expanded view of roof object 109 in a larger scale.

In step 97, the longest straight edge of each roof object is identified. In one implementation, the longest edge is determined by counting the number of pixel locations that extend in approximately the same direction.

In step 98, the orientation of the longest straight edge of each roof object is calculated and stored in memory. The orientation is calculated as a slope relative to the Cartesian axes of the digital image. FIG. 25 shows the longest straight edge 110 of roof object 109, as well as the slope of the edge relative to the vertical axis of image layer 108.

Figure 26:
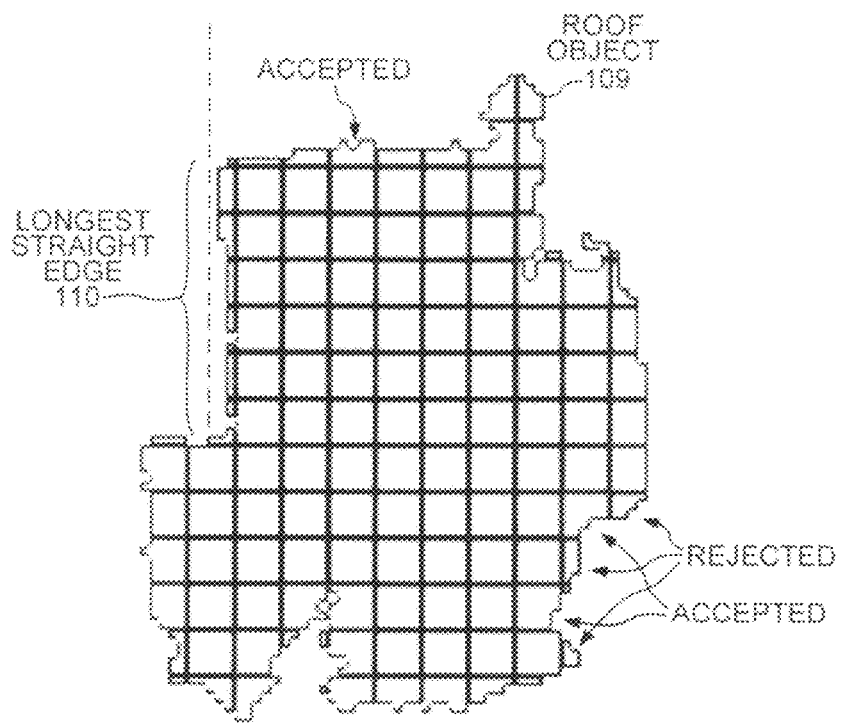

In step 99, each roof object is imprinted into a temporary object network away from the neighborhood of houses on the image layer. In this first imprinting substep 99, each roof object is rotated using the slope calculated in step 98 and translated within the image layer to the temporary object network. In one implementation, each roof object is rotated by the inverse of the slope such that the longest straight edge of the roof object is oriented in a vertical direction. By aligning the longest straight edge with either of the Cartesian axes of the digital image, the process of determining the closest polygon with all right angles that fits each roof object is performed more efficiently. FIG. 26 shows roof object 109 after it has been up-scaled, rotated and translated to the temporary object network. The longest straight edge 110 of roof object 109 is oriented vertically.

In step 100, a conformed roof object is generated from each unconformed roof object. Each conformed roof object is a polygon having all right angles. In one implementation, each conformed roof object also is a union of contiguous, unit-area squares.

In step 101, each conformed roof object is imprinted back into first object network 46 in its original position in the image layer after the conformed roof object is rotated back to its original orientation and translated back to its original position. This is a second imprinting substep of subprocess 107. Thus, some pixel locations are linked to each conformed roof object that were not linked to the original unconformed roof object. Furthermore, some pixel locations are not linked to conformed roof objects that were linked to original unconformed roof objects. The conformed roof object in the temporary object network is then deleted to conserve memory space.

In step 102, the analysis system generates the third object network 51 by imprinting the conformed objects of first object network 46 into objects of second object network 47 such that certain pixel locations in the new image layer are no longer linked to objects of second object network 47 but rather are linked to the conformed objects generated from objects of first object network 46. This is a third imprinting substep of subprocess 107.

Pixel locations in the new image layer are linked only to the conformed roof objects to the extent that those pixel locations correspond both to pixel locations of the original image layer that were linked to unconformed roof objects as well as to pixel locations in the rotated and rescaled image layer that were linked to conformed roof objects. The objects of the neighborhood that become part of the final object network are linked to those pixel locations of the new image layer that correspond to pixel locations of the original image layer that were not linked to conformed roof objects in the rotated and rescaled image layer. A data object is linked to a particular pixel location when the x and y Cartesian coordinates of that pixel location are calculated and stored with the data object.

FIG. 22 also shows subprocess steps 103-106 of step 100 in which conformed roof objects are generated.

In a first subprocess step 103, each imprinted roof object is superimposed over a mesh of unit-area squares. FIG. 26 shows roof object 109 superimposed over the mesh of unit-area squares in the temporary object network.

In step 104, each unit-area square is accepted based on the portion of the unit-area square that is occupied by the imprinted roof object. Each unit-area square is accepted for which the imprinted roof object occupies more than a predetermined threshold portion of the unit-area square. For example, each unit-area square is accepted if the imprinted roof object occupies more than half of the area of the unit-area square. Some unit-area squares are labeled in FIG. 26 that have been accepted because roof object 109 occupies more than the predetermined threshold portion of the unit-area square.

Figure 27:
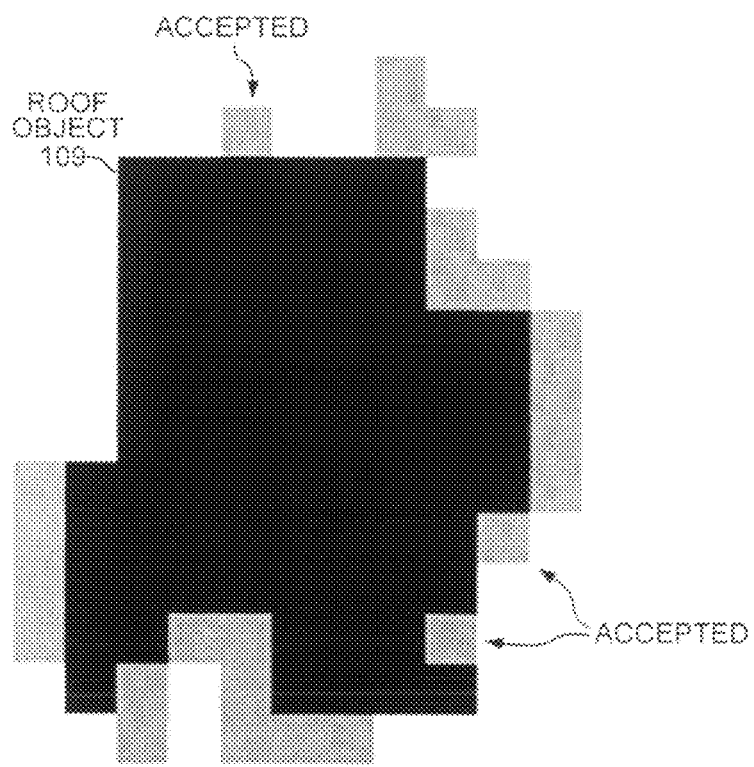

In step 105, all accepted unit-area squares are filled to the extent that they were not already filled by the imprinted roof object superimposed over the unit-area square in step 103. In addition, unit-area squares that are filled less than the threshold portion by the imprinted roof object are rejected. In another example, each unit-area square is rejected if less than one third of the area of the unit-area square is filled by the imprinted roof object. FIG. 27 illustrates the partially-filled unit-area squares that were accepted in step 104. The lighter shaded squares in FIG. 27 represent accepted squares that were originally partially filled and that are filled in step 105.

Figure 28:
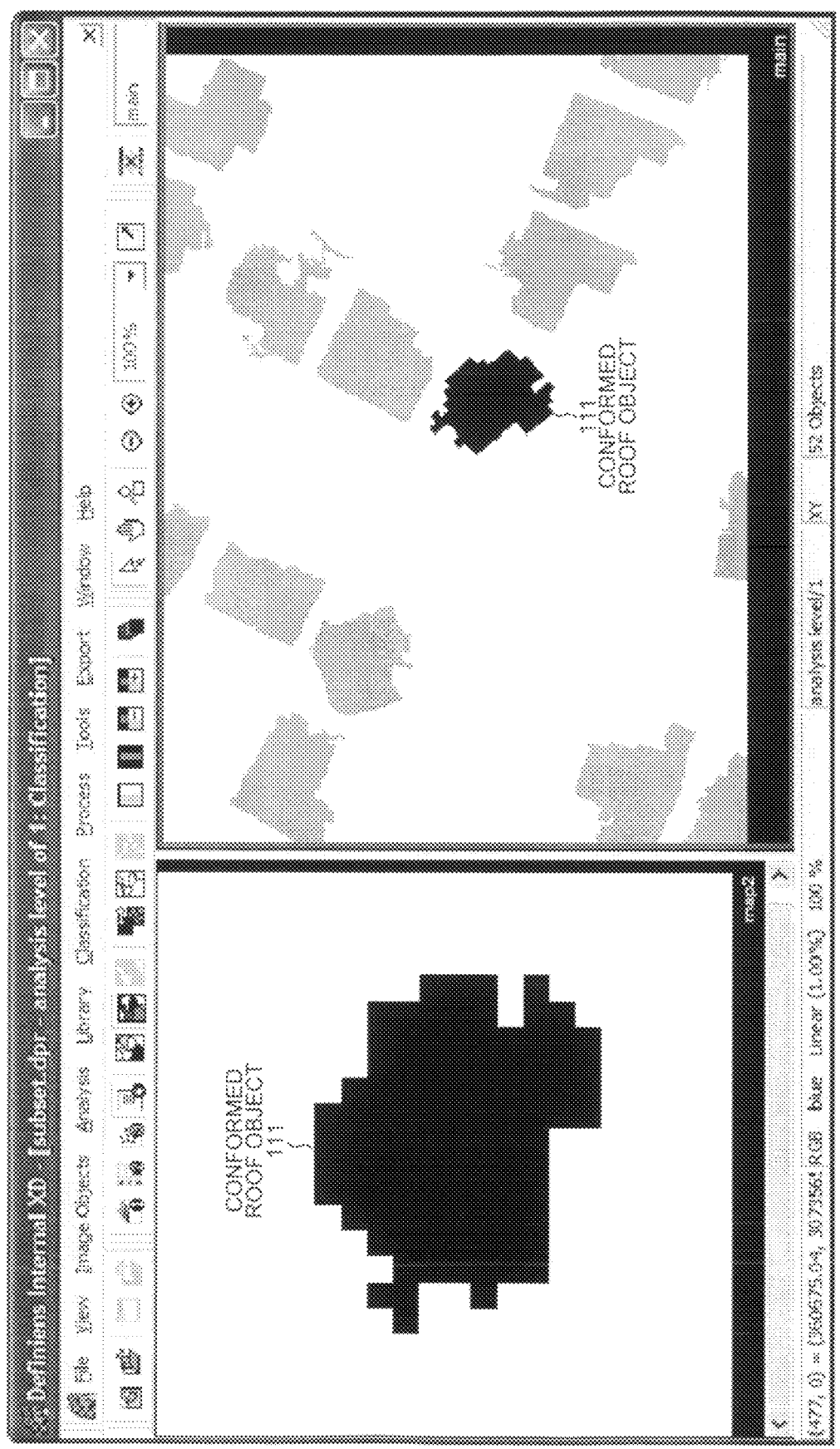

In step 106, all of the accepted, filled unit-area squares are merged to form a union of contiguous, unit-area squares. The merged union of unit-area squares is the conformed roof object generated in step 100. The window at the left of the graphical user interface in FIG. 28 shows the merged, accepted unit-area squares that form a conformed roof object 111. The window at the right of the graphical user interface in FIG. 28 shows conformed roof object 111 after it has been rotated, translated and imprinted in step 101 back into the original position of unconformed roof object 109.

Figure 29:

FIG. 29 shows a new image layer 112 with highlighted conformed roof objects of first object network 46 after all of the conformed roof objects have been imprinted in step 44 of FIG. 4 into objects of second object network 47. The objects of second object network 47 represent streets and vegetation.

Figure 30:
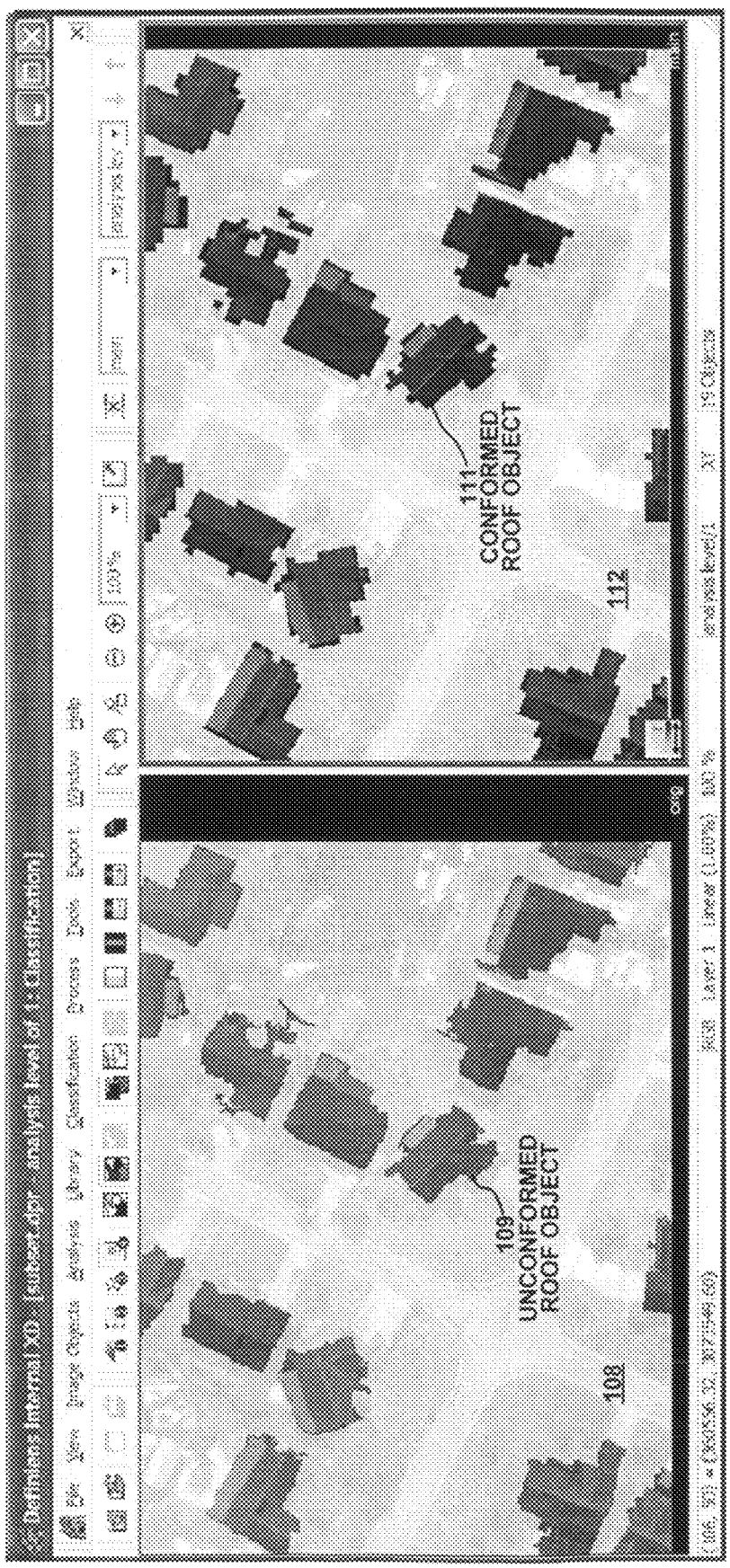

FIG. 30 shows the graphical user interface of the analysis system in which unconformed roof objects of first object network 46 appear on original image layer 108 in the window at the left, and conformed roof objects of first object network 46 appear on new image layer 112 in the window at the right. Thus, FIG. 30 shows the roof objects before and after subprocess 107. After the imprinting steps 99 and 101 are performed, only a subset of the first objects in first object network 46 are imprinted in step 102 into second object network 47. The subset of objects imprinted in step 102 includes only those objects that are linked to pixel locations of the two-dimensional image layer 112 that fall within polygonal regions having all right angles. The third object network is generated in step 102 when the conformed roof objects are imprinted into the second object network 47 of streets and vegetation.

In one application, the user of the analysis system generates the conformed roof objects to assist in calculating the premiums for homeowners' insurance. The conformed roof objects that are polygons with all right angles provide a more accurate method of determining the distance between a house and vegetation in the yard. The analysis system is used to calculate the shortest distance between vegetation, such as shrubbery, and the house. During a wild fire, burning vegetation that is closer to the house is more likely to start the house burning. The conformed roof objects that are polygons with all right angles also provides a more accurate assessment of the square footage of the house, which can also be used as a basis for setting the insurance premiums.

In a map-making application, the polygonal roofs generated by subprocess 107 improve the appearance of the map. Subprocess 107 modifies the objects classified as houses into objects with more regular shapes while retaining a close spatial correspondence to the original irregular-shaped roof objects. Consumers of the maps expect houses and the associated roofs to have straight sides and walls with right angles. Thus, purchasers of maps prefer the aerial view in the window at the right of FIG. 30 to the irregular shaped roofs in the window at the left of FIG. 30. The quality of the conformed roof objects generated in subprocess 107 is influenced by the size of the unit-area squares and the predetermined filling threshold used to accept or reject squares.

Figure 31:
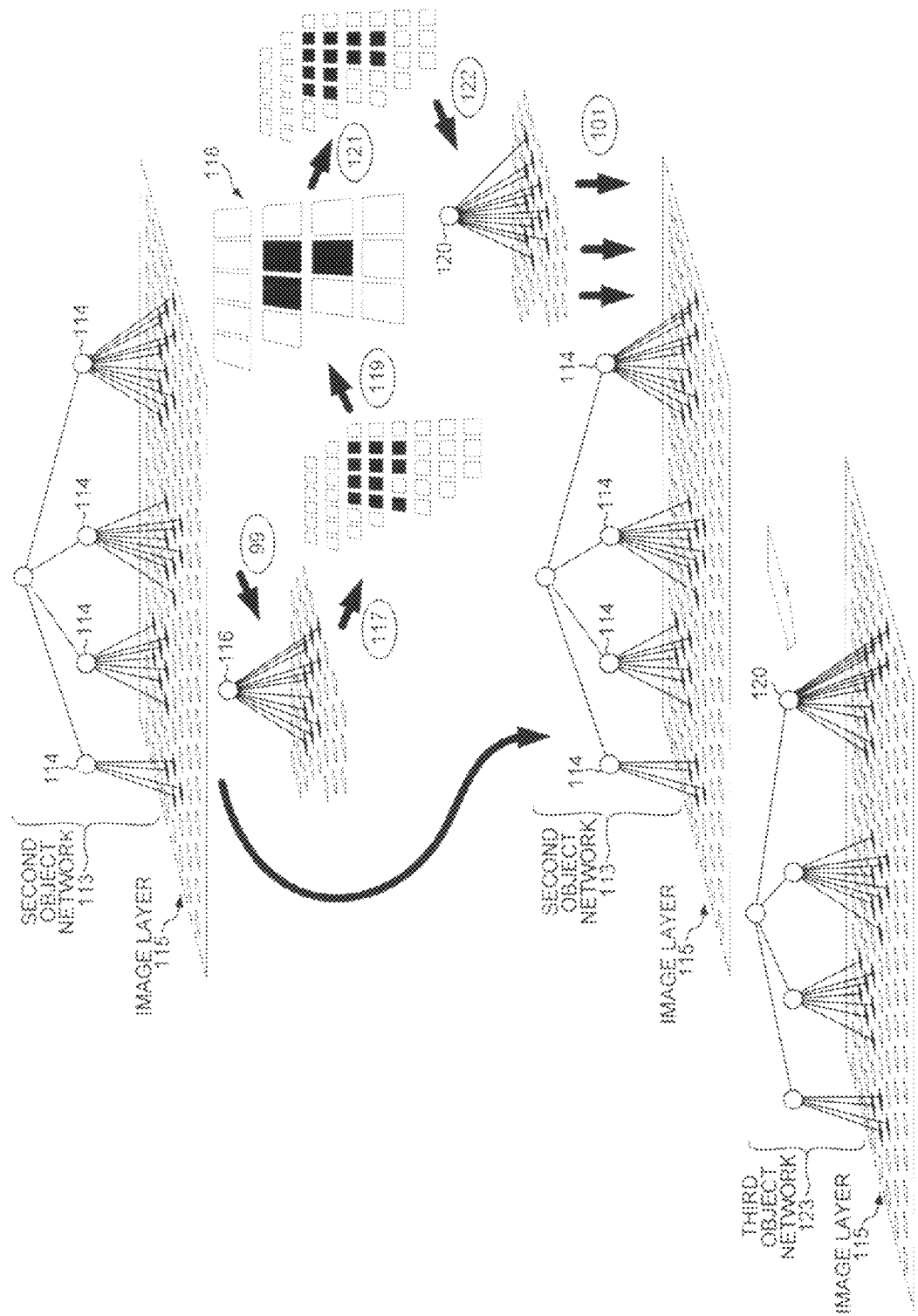
FIG. 31 is a schematic diagram of image layers illustrating how conformed roof objects are generated and then imprinted back into the original image layer.

FIG. 31 is a schematic diagram of image layers illustrating how conformed roof objects are generated in subprocess steps 103-106 of step 100 and then imprinted back into the original image layer in step 101.

A second object network 113 includes unconformed roof objects 114 that are linked to pixel locations in an image layer 115. In step 99, an unconformed roof object 116 is imprinted into a temporary object network away from the neighborhood of houses on image layer 115. Then, unconformed roof object 116 is rotated 117 such that the longest edge of unconformed roof object 116 is aligned with the horizontal axis of the temporary work area on image layer 115. In subprocess step 103, roof object 116 is superimposed over a mesh of unit-area squares. Each unit-area square corresponds to a pixel location of a lower resolution image layer 118. In step 104, each unit-area square is accepted based on the portion of the unit-area square that is occupied by imprinted unconformed roof object 116. Each unit-area square is accepted for which the imprinted roof object occupies two or more pixel locations of the four pixel locations of the higher resolution image layer 115 that fit into each larger pixel location of lower resolution image layer 118.

In step 105, all accepted unit-area squares are filled to the extent that they were not already filled by the imprinted roof object superimposed over the unit-area square in step 103. The filled unit-area squares are merged to form a union of contiguous, unit-area squares. Unit-area squares that are filled less than the two-pixel threshold by the imprinted unconformed roof object 116 are rejected. Steps 103-105 have the effect of downscaling 119 unconformed roof object 116. The contiguous, unit-area squares formed by downscaling unconformed roof object 116 becomes a conformed roof object 120. Conformed roof object 120 is then upscaled 121 to the same resolution as image layer 115. Upscaled, conformed roof object 120 is then rotated 122 back to the orientation of unconformed roof object 116, translated back to the position of unconformed roof object 116 on first image layer 115, and imprinted in step 101 over the unconformed roof objects 114 of second object network 113 at the original position of unconformed roof object 116. A third object network 123 is generated when conformed roof object 120 is imprinted in step 101 back into the original image layer 115.

Although the present invention has been described in connection with certain specific embodiments for instructional purposes, the present invention is not limited thereto. For example, although embodiments of the analysis system and computer-implemented network structure have been described above in relation to detecting and analyzing geographical regions and anatomical regions of the human body, the analysis system and network structure can equally be applied to detecting and analyzing military targets, motor vehicles, weather patterns and geological formations. Accordingly, various modifications, adaptations, and combinations of various features of the described embodiments can be practiced without departing from the scope of the invention as set forth in the claims.

What is claimed is:

1. A method comprising:
(a) specifying a first object class;
(b) specifying a second object class;
(c) generating a first object network, wherein each object of the first object network belongs to the first object class, wherein the first object network includes a first object that is linked to a first plurality of pixel locations;
(d) generating a second object network, wherein each object of the second object network belongs to the second object class, wherein the second object network includes a second object that is linked to a second plurality of pixel locations, wherein all of the objects of the second object network are linked to a third plurality of pixel locations, and wherein the third plurality of pixel locations includes the second plurality of pixel locations;
(e) generating a third object network by imprinting each object of the first object network into the second object network, wherein the third object network includes a third object that is linked to a fourth plurality of pixel locations, wherein the fourth plurality of pixel locations is a subset of the third plurality of pixel locations and is calculated from the first plurality of pixel locations;
(f) determining a characteristic of the third object by measuring the third object; and
(g) displaying the third object on a computer display.

2. The method of claim 1, wherein the first plurality of pixel locations is in a first digital image, and the third plurality of pixel locations is in a second digital image.

3. The method of claim 2, wherein the calculation in (e) is based on both a first coordinate system of the first digital image and a second coordinate system of the second digital image.

4. The method of claim 1, wherein the calculation in (e) involves scaling, rotating and translating the first plurality of pixel locations.

5. The method of claim 2, wherein the first digital image has a first coordinate system and the second digital image has a second coordinate system, and wherein the calculation in (e) involves scaling, rotating and translating the first plurality of pixel locations using the second coordinate system.

6. The method of claim 5, further comprising:
determining a characteristic of the first object by measuring the first object, wherein the scaling, rotating and translating of the first plurality of pixel locations is performed based on the measured characteristic of the first object.

7. The method of claim 1, further comprising:
(h) generating a fourth object network by modifying the third object network such that each object of the third object network that is linked to pixel locations that are not contiguous to one another is divided into multiple objects of the fourth object network that are linked only to contiguous pixel locations.

8. The method of claim 1, wherein each object of the first object network fulfills a predefined condition.

9. The method of claim 8, wherein the condition is fulfilled by a minimum predetermined proportion of the first plurality of pixel locations satisfying the predefined condition.

10. The method of claim 8, wherein the condition is fulfilled by each object of the first object network having a higher probability of belonging to the first object class than belonging to the second object class.

11. The method of claim 1, wherein the generating the third object network in (e) is performed by imprinting a subset of the objects of the first object network into the second object network, and wherein objects in the subset are linked only to those pixel locations of a N-dimensional digital image that that fall within polyhedral region of the N-dimensional digital image.

12. The method of claim 1, further comprising:
(h) restoring the first object network and discarding the third object network if the characteristic of the third object determined in (f) does not satisfy a predetermined condition.

13. The method of claim 1, wherein the generating the first object network in (c) is performed using one processor of a computer at the same time that the generating the second object network in (d) is performed using another processor of the computer.

14. The method of claim 1, wherein the second object network is stored in a memory space, and wherein the second object network is overwritten by the third object network in the memory space.

15. The method of claim 1, wherein the first object class represents road segments, wherein each road segment has a length, and wherein the measuring the third object in (f) measures the length of the road segment.

16. The method of claim 1, wherein the first object class represents houses, wherein each house has a roof, and wherein the measuring in (f) measures the area of the roof.

17. The method of claim 1, wherein the first object class represents nuclei that are stained positive or negative, and wherein the measuring in (f) measures the number of nuclei stained positive and the number of nuclei stained negative.

18. A method comprising:
in a specification mode specifying a first object class and a second object class;
selecting process steps of an image analysis script that define a segmentation method that generates a first object network belonging to the first object class and a second object network belonging to the second object class;
selecting an imprinting process step of the image analysis script by selecting the first object class and the second object class;
selecting a measurement process step of the image analysis script by specifying characteristics of a target object;
saving the image analysis script to a memory;
acquiring pixel values that are associated with pixel locations of a digital image; and
in an execution mode running the image analysis script, wherein the image analysis script:
executes the process steps of the segmentation method and generates the first object network and the second object network, wherein the first object network includes a first object, and wherein the second object network includes a second object;
imprints the first object network into the second object network such that a third object network is generated, wherein the third object network includes a third object; and
determines a characteristic of the third object.

19. The method of claim 18, wherein in the execution mode the image analysis script restores the second object network and discards the third object network if the characteristic of the third object does not satisfy a predetermined condition.

20. The method of claim 18, wherein the image analysis script generates the first object network by executing on a first computer processor and generates the second object network by executing at the same time on a second computer processor.

21. The method of claim 18, wherein the characteristic of the third object is displayed on a computer display.

22. The method of claim 18, wherein the characteristic of the third object is stored in a database.

23. A non-transitory computer-readable medium having computer-executable instructions for analyzing a digital image by performing the steps of:
(a) generating a first plurality of objects by linking a first plurality of pixel locations on the digital image to the first plurality of objects, wherein the first plurality of objects forms a first object network;
(b) linking each of the first plurality of objects to a first object class;
(c) generating a second plurality of objects by linking a second plurality of the pixel locations to the second plurality of objects, wherein the second plurality of objects forms a second object network, wherein a third plurality of the pixel locations includes those pixel locations that belong both to the first plurality and to the second plurality of the pixel locations;
(d) linking each of the second plurality of objects to a second object class;
(e) generating a third object network by imprinting the first plurality of objects into the second plurality of objects such that the third plurality of pixel locations are relinked from objects of the second plurality of objects to objects of the third object network; and
(f) determining a characteristic of an object of the third object network by measuring the object.

24. A method comprising:
(a) specifying a first object class, wherein a first plurality of objects belongs to the first object class;
(b) specifying a second object class, wherein a second plurality of objects belongs to the second object class;
(c) acquiring pixel values that are associated with pixel locations;
(d) generating the first plurality of objects by linking a first plurality of the pixel locations to the first plurality of objects, wherein the first plurality of objects forms a first object network;
(e) linking each of the first plurality of objects to the first object class;
(f) generating the second plurality of objects by linking a second plurality of the pixel locations to the second plurality of objects, wherein the second plurality of objects forms a second object network, wherein a third plurality of the pixel locations includes those pixel locations that belong both to the first plurality and to the second plurality of the pixel locations;
(g) linking each of the second plurality of objects to the second object class;
(h) generating a third object network by imprinting the first plurality of objects into the second plurality of objects such that objects of the first plurality of objects that become part of the third object network are linked to the third plurality of pixel locations, and objects of the second plurality of objects that become part of the third object network are not linked to the third plurality of pixel locations;
(i) determining a characteristic of an object of the third object network by measuring the object; and (j) displaying the object of the third object network on a computer display.

25. The method of claim 24, wherein the first plurality of pixel locations has a first resolution and the second plurality of pixel locations has a second resolution, and wherein the first resolution is different than the second resolution.

26. The method of claim 24, wherein the third plurality of pixel locations and the second plurality of pixel locations have equal resolutions, wherein the second plurality of pixel locations has a higher resolution than does the first plurality of pixel locations, and wherein those pixel locations that belong both to the first plurality and to the second plurality of the pixel locations include all those pixel locations of the third plurality of pixel locations that fall within any pixel location of the first plurality of pixel locations.

27. The method of claim 24, further comprising:
generating a fourth object network by modifying the third object network such that each object of the second plurality of objects that is linked to pixel locations that are not contiguous to one another is divided into objects of the fourth object network that are linked only to contiguous pixel locations.

28. The method of claim 24, wherein the generating the third object network in (h) is performed by imprinting a subset of the first plurality of objects into the second plurality of objects, wherein the subset includes only those objects of the first plurality of objects for which a minimum predetermined proportion of the pixel locations that are linked to those objects are also linked to objects of the second plurality of objects.

29. The method of claim 24, wherein the imprinting in (h) involves scaling, rotating and translating an object of the first object network before imprinting the first plurality of objects into the second plurality of objects.

30. The method of claim 24, wherein the generating the third object network in (h) is performed by imprinting a subset of the first plurality of objects into the second plurality of objects, and wherein the subset includes only those pixel locations of a three-dimensional digital image that are linked to objects of the first plurality of objects that fall within a polyhedral region of the three-dimensional digital image.

31. The method of claim 24, wherein the generating the first plurality of objects in (d) is performed using one processor of a computer at the same time that the generating the second plurality of object in (f) is performed using another processor of the computer.

32. The method of claim 24, wherein the second object network is stored in a memory space, and wherein the second object network is overwritten by the third object network in the memory space.

33. The method of claim 24, wherein the first object class represents road segments, wherein each road segment has a length, and wherein the measuring the object in (i) measures the length of the road segment.

34. The method of claim 24, wherein the first object class represents houses, wherein each house has a roof, and wherein the measuring in (i) measures the area of the roof.

35. A method comprising:
specifying a first object class, wherein a first plurality of objects belongs to the first object class;
specifying a second object class, wherein a second plurality of objects belongs to the second object class;
selecting a first process step to be added to an image analysis script, wherein the first process step performs a first segmentation of objects of an object network into the first object class, wherein the first process step is selected from a database of process steps;
selecting a second process step to be added to the image analysis script, wherein the second process step performs a second segmentation of the objects of the object network into the second object class;
saving the image analysis script to a memory;
acquiring pixel values that are associated with pixel locations of a digital image; and
running the image analysis script, wherein the image analysis script:
executes the first process step by linking a first plurality of the pixel locations to the first plurality of objects;
executes the second process step by linking a second plurality of the pixel locations to the second plurality of objects, wherein a third plurality of the pixel locations includes those pixel locations that belong both to the first plurality and to the second plurality of the pixel locations;
imprints the first plurality of objects into the second plurality of objects such that each of the third plurality of the pixel locations is unlinked from an object of the second plurality of objects and remains linked to an object of the first plurality of objects; and
determines a characteristic of an object linked to pixel locations of the third plurality of the pixel locations by measuring the object.

36. The method of claim 35, wherein the image analysis script imprints only a subset of the first plurality of objects into the second plurality of objects, and wherein the subset includes only those objects of the first plurality of objects that fulfill a condition.

37. The method of claim 35, wherein the first process step is executed on one processor of a computer at the same time that the second process step is executed on another processor of the computer.

38. A system comprising:
a display on which a digital image having pixel locations is displayed, wherein an object corresponds to a first plurality of the pixel locations on the digital image; and
means for measuring the object, wherein the object is part of a first object network, wherein the means generates a second object network by linking a second plurality of the pixel locations to objects of the second object network, wherein the means generates a third object network by linking a third plurality of the pixel locations to objects of the third object network, wherein a fourth plurality of the pixel locations includes those pixel locations that belong both to the second plurality and to the third plurality of the pixel locations, and wherein the means generates the first object network by imprinting the objects of the second object network into the objects of the third object network such that the fourth plurality of the pixel locations are unlinked from objects of the third object network and remain linked to objects of the second object network.

39. The system of claim 38, wherein the means displays an outline of the object in the digital image on the display.

40. The system of claim 38, wherein the means is executed as a script on a processor.

* * * * *